United States Patent
Kanno

(10) Patent No.: US 11,749,813 B2
(45) Date of Patent: Sep. 5, 2023

(54) BIPOLAR PLATE, CELL FRAME, CELL STACK, AND REDOX FLOW BATTERY

(71) Applicant: SUMITOMO ELECTRIC INDUSTRIES, LTD., Osaka (JP)

(72) Inventor: Takashi Kanno, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 253 days.

(21) Appl. No.: 17/426,876

(22) PCT Filed: Feb. 3, 2020

(86) PCT No.: PCT/JP2020/003999
§ 371 (c)(1),
(2) Date: Jul. 29, 2021

(87) PCT Pub. No.: WO2020/166418
PCT Pub. Date: Aug. 20, 2020

(65) Prior Publication Data
US 2022/0109165 A1    Apr. 7, 2022

(30) Foreign Application Priority Data

Feb. 14, 2019    (JP) ................................. 2019-024664

(51) Int. Cl.
*H01M 8/0258*    (2016.01)
*H01M 8/0273*    (2016.01)
*H01M 8/18*    (2006.01)

(52) U.S. Cl.
CPC ....... *H01M 8/0258* (2013.01); *H01M 8/0273* (2013.01); *H01M 8/18* (2013.01)

(58) Field of Classification Search
CPC ......... H01M 8/18–188; H01M 8/0258; H01M 8/0273
See application file for complete search history.

(56) References Cited

U.S. PATENT DOCUMENTS

| | | | |
|---|---|---|---|
| 2015/0263358 A1* | 9/2015 | Zaffou | H01M 8/20 429/81 |
| 2017/0012299 A1 | 1/2017 | Itou et al. | |
| 2017/0012308 A1* | 1/2017 | Ikeuchi | H01M 8/20 |
| 2017/0047594 A1 | 2/2017 | Hanafusa et al. | |

(Continued)

FOREIGN PATENT DOCUMENTS

| | | | | |
|---|---|---|---|---|
| CN | 110854404 B | * | 7/2021 | ......... H01M 8/0258 |
| JP | 2015-122230 A | | 7/2015 | |

(Continued)

OTHER PUBLICATIONS

Machine translation of CN-110854404-B (Year: 2023).*

*Primary Examiner* — Matthew J Merkling
(74) *Attorney, Agent, or Firm* — Oliff PLC

(57) ABSTRACT

A bipolar plate faces an electrode of a redox flow battery and includes an introduction channel and a discharge channel of an electrolyte. One of the introduction channel and the discharge channel is a groove-like flow channel that is formed in a surface of the bipolar plate, and the other of the introduction channel and the discharge channel is a pipe-like flow channel that is formed in an inside of the bipolar plate. The bipolar plate includes a communication hole that communicates with the pipe-like flow channel from the surface.

11 Claims, 14 Drawing Sheets

(56) References Cited

U.S. PATENT DOCUMENTS

2018/0159163 A1 6/2018 Hanafusa et al.
2019/0088972 A1 3/2019 Hanafusa et al.
2019/0348692 A1 11/2019 Fujita et al.

FOREIGN PATENT DOCUMENTS

| JP | 2015-122231 A | 7/2015 |
| JP | 2015-138771 A | 7/2015 |
| JP | 2015-210849 A | 11/2015 |
| JP | 2017-157302 A | 9/2017 |
| WO | 2016/072254 A1 | 5/2016 |
| WO | 2016/189970 A1 | 12/2016 |
| WO | 2019/021440 A1 | 1/2019 |
| WO | 2019/021441 A1 | 1/2019 |

\* cited by examiner

Kinoliding stack in which stacking of a cell frame, a positive electrode, a membrane, a negative electrode, and a cell frame is performed a plurality of times and in which the layered body is sandwiched by supply/discharge plates, and a redox flow battery that uses the cell stack. The cell frame includes a bipolar plate that faces an electrode and a frame body that is disposed at an outer periphery of the bipolar plate. In this structure, one cell is formed between bipolar plates of respective cell frames that are adjacent to each other.

BIPOLAR PLATE, CELL FRAME, CELL STACK, AND REDOX FLOW BATTERY

TECHNICAL FIELD

The present disclosure relates to a bipolar plate, a cell frame, a cell stack, and a redox flow battery.

This application claims priority based on Japanese Patent Application No. 2019-024664 filed on Feb. 14, 2019, the entire contents of which are incorporated herein by reference.

BACKGROUND ART

Patent Literature 1 to Patent Literature 4 describe a cell stack in which stacking of a cell frame, a positive electrode, a membrane, a negative electrode, and a cell frame is performed a plurality of times and in which the layered body is sandwiched by supply/discharge plates, and a redox flow battery that uses the cell stack. The cell frame includes a bipolar plate that faces an electrode and a frame body that is disposed at an outer periphery of the bipolar plate. In this structure, one cell is formed between bipolar plates of respective cell frames that are adjacent to each other.

Patent Literature 1 to Patent Literature 4 disclose, for sufficiently spreading an electrolyte to the positive electrode and the negative electrode in each cell, a structure including a plurality of grooves in a surface of each bipolar plate facing the positive electrode and in a surface of each bipolar plate facing the negative electrode. These grooves function as introduction channels and discharge channels of an electrolyte. The introduction channels primarily have the role of spreading the electrolyte over the entire surfaces of the bipolar plates and introducing the electrolyte to the electrodes that are disposed at the bipolar plates. The discharge channels primarily have the role of collecting the electrolyte from the electrodes and discharging the electrolyte from the bipolar plates.

CITATION LIST

Patent Literature

PTL 1: Japanese Unexamined Patent Application Publication No. 2015-122230
PTL 2: Japanese Unexamined Patent Application Publication No. 2015-122231
PTL 3: Japanese Unexamined Patent Application Publication No. 2015-138771
PTL 4: Japanese Unexamined Patent Application Publication No. 2015-210849

SUMMARY OF INVENTION

A bipolar plate of the present disclosure faces an electrode of a redox flow battery and includes an introduction channel and a discharge channel of an electrolyte, in which one of the introduction channel and the discharge channel is a groove-like flow channel that is formed in a surface of the bipolar plate, and the other of the introduction channel and the discharge channel is a pipe-like flow channel that is formed in an inside of the bipolar plate, and in which the bipolar plate includes a communication hole that communicates with the pipe-like flow channel from the surface.

A cell frame of the present disclosure includes
the bipolar plate of the present disclosure; and
a frame body that is provided at an outer periphery of the bipolar plate.

A cell stack of the present disclosure includes
the cell frame of the present disclosure.

A redox flow battery of the present disclosure includes
the cell stack of the present disclosure.

DESCRIPTION OF EMBODIMENTS

Problems to be Solved by Invention

Figure 1:
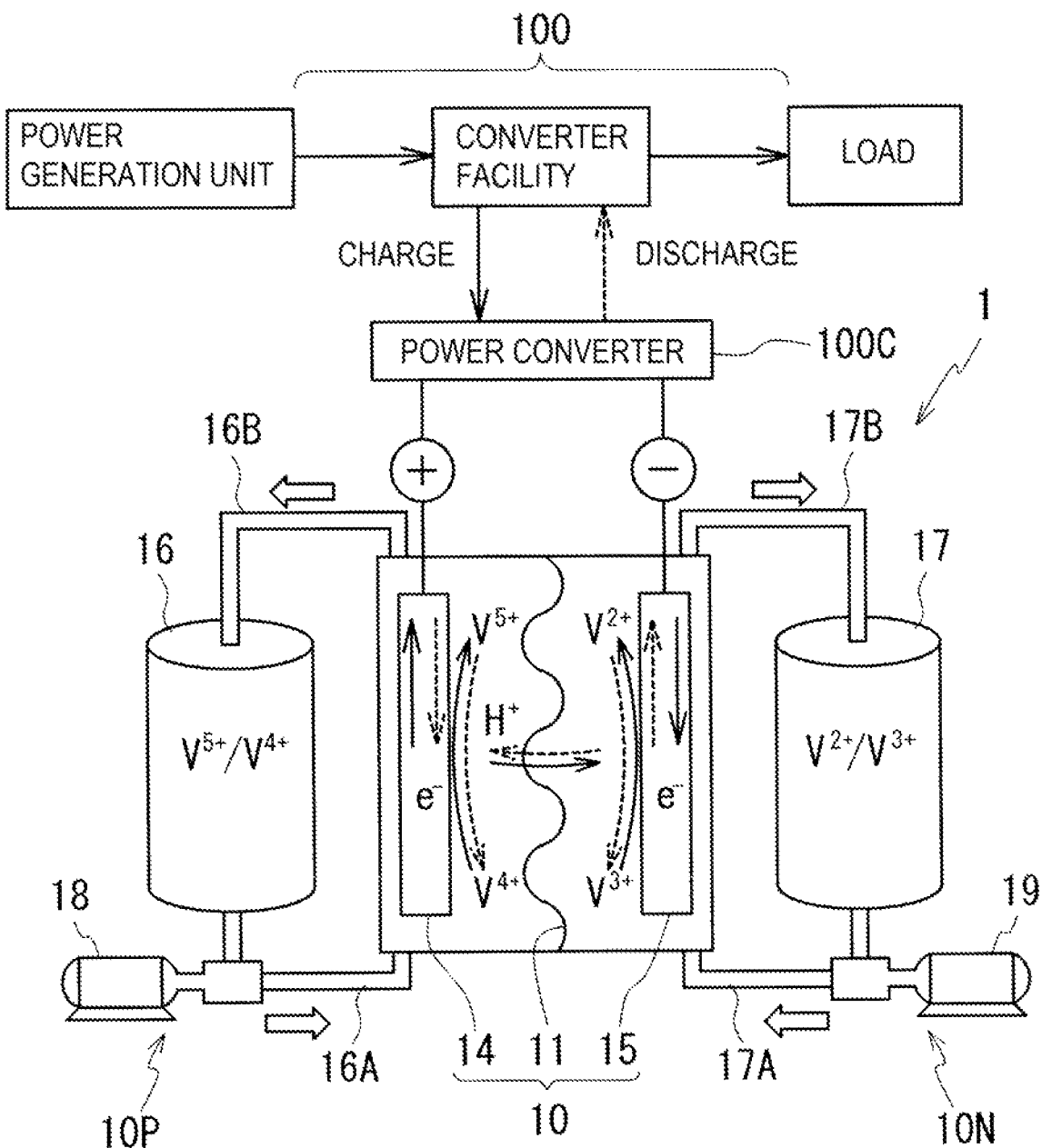
FIG. 1 is an explanatory view of the principle of operation of a redox flow battery according to a first embodiment.

In recent years, there has been a need for the construction of an environmentally friendly energy system, and the improvement of the battery performance of a redox flow battery is expected as a part of meeting this need. The inventor has focused on the flow channels of a bipolar plate of a cell frame of a redox flow battery, and has studied structures that are capable of improving the battery performance of the redox flow battery.

An object of the present disclosure is to provide a bipolar plate that improves the battery performance of a redox flow battery. In addition, an object of the present disclosure is to provide a cell frame and a cell stack that improve the battery performance of the redox flow battery. Further, an object of the present disclosure is to provide a redox flow battery having excellent battery performance.

Advantageous Effects of Invention

According to the bipolar plate of the present disclosure, a redox flow battery having excellent battery performance can be constructed.

According to the cell frame of the present disclosure, a redox flow battery having excellent battery performance can be constructed.

According to the cell stack of the present disclosure, a redox flow battery having excellent battery performance can be constructed.

The redox flow battery of the present disclosure has better battery performance than conventional structures.

Description of Embodiments of Present Disclosure

First, the contents of embodiments of the present disclosure are enumerated and described.

<1> A bipolar plate according to an embodiment is a bipolar plate facing an electrode of a redox flow battery and including an introduction channel and a discharge channel of an electrolyte, in which one of the introduction channel and the discharge channel is a groove-like flow channel that is formed in a surface of the bipolar plate, and the other of the introduction channel and the discharge channel is a pipe-like flow channel that is formed in an inside of the bipolar plate, and in which the bipolar plate includes a communication hole that communicates with the pipe-like flow channel from the surface.

The bipolar plate of the embodiment can have a larger number of introduction channels and discharge channels than conventional bipolar plates. When the number of introduction channels and the number of discharge channels that are formed in a bipolar-plate surface of a conventional bipolar plate become large, the amount of electrolyte that is discharged from the bipolar plate before a battery reaction tends to be large. In contrast, in the bipolar plate of the embodiment, even if the number of introduction channels and the number of discharge channels are made large, it is possible to suppress an increase in the amount of electrolyte that is discharged from the bipolar plate before the reaction. This is because, in the bipolar plate of the embodiment, since the introduction channel and the discharge channel exist at locations that differ from each other in a thickness direction, the flow of the electrolyte between the introduction channel and the discharge channel is easily adjusted. In addition, that the flow of the electrolyte above is easily adjusted due to the number of communication holes that communicate with the pipe-like flow channel (the introduction channel or the discharge channel) from the surface of the bipolar plate is a factor that makes it possible to suppress an increase in the amount of unreacted electrolyte. If the bipolar plate of this embodiment is used, it is possible to cause the electrolyte to undergo sufficient battery reaction and to quickly collect the reacted electrolyte, as a result of which it is possible to fabricate a redox flow battery having excellent charge and discharge efficiency.

In the bipolar plate of the embodiment, when the number of introduction channels is made large, it is possible to quickly spread the electrolyte over the entire surface of the bipolar plate, and to uniformly supply the electrolyte over the entire surface of the electrode that faces the bipolar plate. In addition, when the number of discharge channels is made large, it is possible to quickly collect the reacted electrolyte from the entire surface of the electrode. When the number of discharge channels is large, it is possible to reduce pressure loss when the electrolyte flows, as a result of which it is possible to reduce the output of a pump that causes the electrolyte to circulate. As a result, it is possible to reduce the power consumption amount when the redox flow battery operates.

<2> One form of the bipolar plate according to the embodiment is a form in which the introduction channel is the groove-like flow channel and the discharge channel is the pipe-like flow channel.

When the introduction channel is the groove-like flow channel that is formed in the surface of the bipolar plate, the electrolyte is easily spread quickly over the entire surface of the bipolar plate. In addition, when the discharge channel is the pipe-like flow channel that is formed in the inside of the bipolar plate, it is possible to quickly collect the reacted electrolyte from the surface of the bipolar plate. As a result, it is possible to suppress the battery reaction at the electrode that is disposed at the surface of the bipolar plate from being hindered by the reacted electrolyte.

<3> One form of the bipolar plate according to the embodiment is a form in which the groove-like flow channel and the pipe-like flow channel extend in directions that intersect each other.

When the extension direction of the groove-like flow channel and the extension direction of the pipe-like flow channel intersect each other, it is possible to increase the bending rigidity of the bipolar plate. If the extension direction of the groove-like flow channel and the extension direction of the pipe-like flow channel are parallel to each other, the bending strength of the bipolar plate in a specific direction may be insufficient.

<4> One form of the bipolar plate of <3> above is a form in which the groove-like flow channel and the pipe-like flow channel extend in directions that are orthogonal to each other.

When the extension direction of the groove-like flow channel and the extension direction of the pipe-like flow channel are orthogonal to each other, it is possible to increase the bending rigidity of the bipolar plate. In addition, according to the structure above, the flow of the electrolyte at the bipolar plate becomes smooth.

<5> One form of the bipolar plate according to the embodiment is a form that includes a plurality of the groove-like flow channels, in which at least one communication hole, the communication hole being the communication hole that communicates with the pipe-like flow channel from the surface, is disposed in an inter-groove region that is interposed between one of the groove-like flow channels and another one of the groove-like flow channels that is adjacent to the one of the groove-like flow channels.

When a communication hole exists at a location that is interposed between two groove-like flow channels that are adjacent to each other, the electrolyte moves smoothly between the groove-like flow channels and the pipe-like flow channel. For example, when the introduction channel is a groove-like flow channel, the electrolyte that has spread in a planar direction of the bipolar plate from the groove-like flow channel is quickly collected in the communication hole that exists at a location that is interposed between the two groove-like flow channels. When the discharge channel is a groove-like flow channel, the electrolyte that has spread in the planar direction of the bipolar plate from the communication hole is quickly collected in two groove-like flow channels that exist on two sides of the communication hole.

<6> One form of the bipolar plate of <5> above is a form in which the inter-groove region includes a communication hole group in which a plurality of the communication holes are disposed side by side in a direction along the groove-like flow channels.

When the plurality of the communication holes that are disposed side by side in the direction along the groove-like flow channels are provided between two groove-like flow channels that are adjacent to each other, the electrolyte moves even more smoothly between the groove-like flow channels and the pipe-like flow channel.

<7> One form of the bipolar plate of <6> above is a form that includes a link groove that connects to each other the communication holes that are close to each other in the communication hole group.

When the communication holes in the communication hole group are connected to each other through the link groove, the electrolyte moves smoothly between the groove-like channels and the pipe-like flow channel.

<8> One form of the bipolar plate according to the embodiment is a form in which the introduction channel is the groove-like flow channel, in which the discharge channel is the pipe-like flow channel, in which at least one communication hole, the communication hole being the communication hole that communicates with the pipe-like flow channel from the surface, is disposed between a plurality of the groove-like flow channels, the plurality of the groove-like flow channels being one of the groove-like flow channels and another one of the groove-like flow channels that is adjacent to the one of the groove-like flow channels, and in which the introduction channel and the discharge channel extend in directions that are orthogonal to each other.

According to the bipolar plate above, it is possible to provide the advantageous effects of all of the structures of <1> to <5>.

<9> A cell frame according to an embodiment includes the bipolar plate according to the embodiment, and a frame body that is provided at an outer periphery of the bipolar plate.

By manufacturing a redox flow battery by using the cell frame, the battery performance of the redox flow battery is improved. This is because the charge and discharge efficiency of an electrolyte is increased by the bipolar plate of the embodiment. In addition, a reduction in the consumption power of, for example, a pump that causes the electrolyte to circulate by the bipolar plate of the embodiment contributes to improving the battery performance of the redox flow battery.

<10> A cell stack according to an embodiment includes the cell frame according to the embodiment.

By manufacturing a redox flow battery by using the cell stack, the battery performance of the redox flow battery is improved. This is because a bipolar plate of the cell frame that is used in the cell stack is the bipolar plate according to the embodiment.

<11> A redox flow battery according to an embodiment includes the cell stack according to the embodiment.

Since the redox flow battery according to the embodiment includes the cell stack of the embodiment, the redox flow battery has excellent battery performance.

Details of Embodiments of Present Disclosure

Embodiments of a bipolar plate, a cell frame, a cell stack, and a redox flow battery (RF battery) of the present disclosure are described below. Note that the present invention is not limited to the structures that are described in the embodiments, but is defined by the terms of the claims and is intended to include any modifications within the scope and meaning equivalent to the terms of the claims.

First Embodiment

Figure 2:
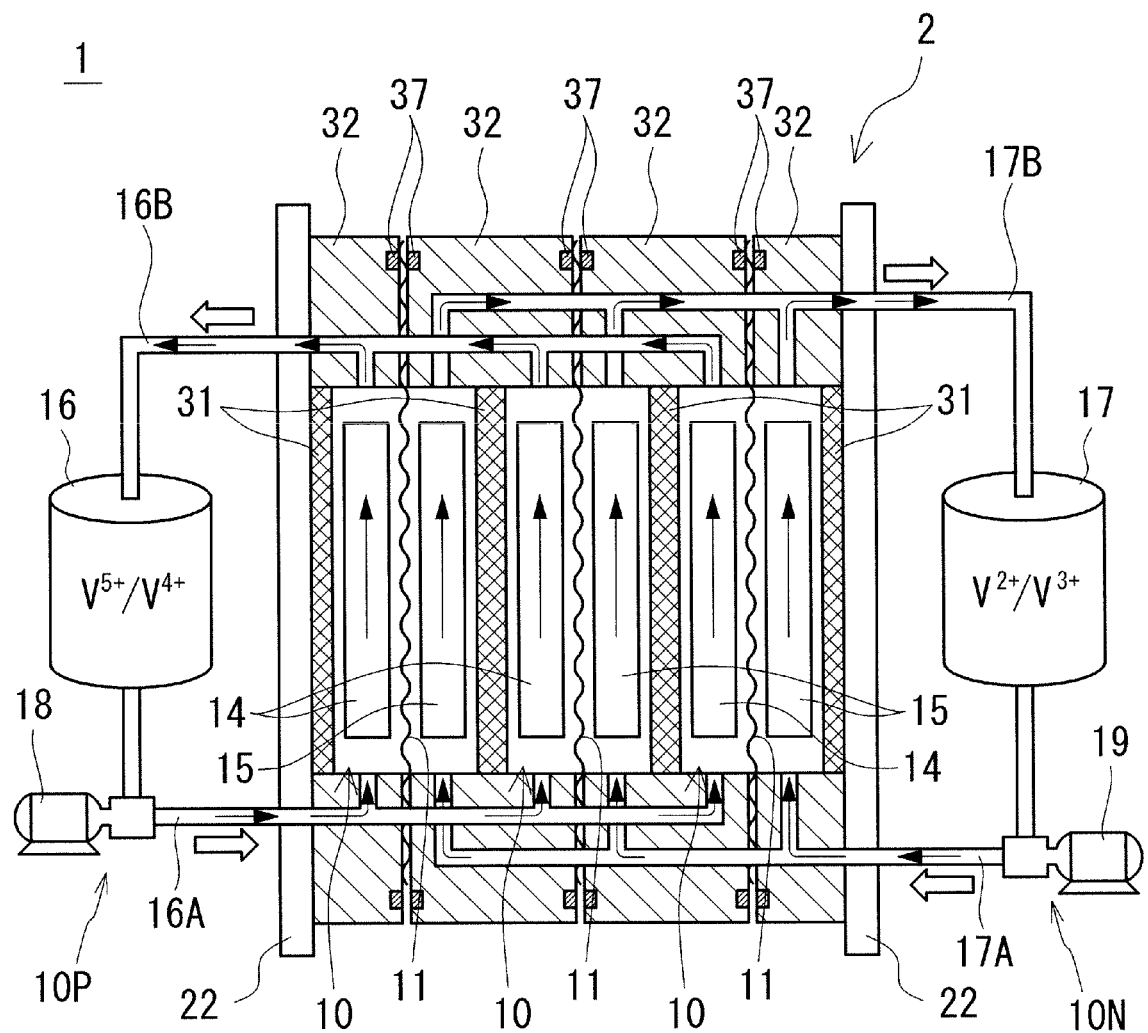
FIG. 2 is a schematic structural view of the redox flow battery according to the first embodiment.
Figure 3:
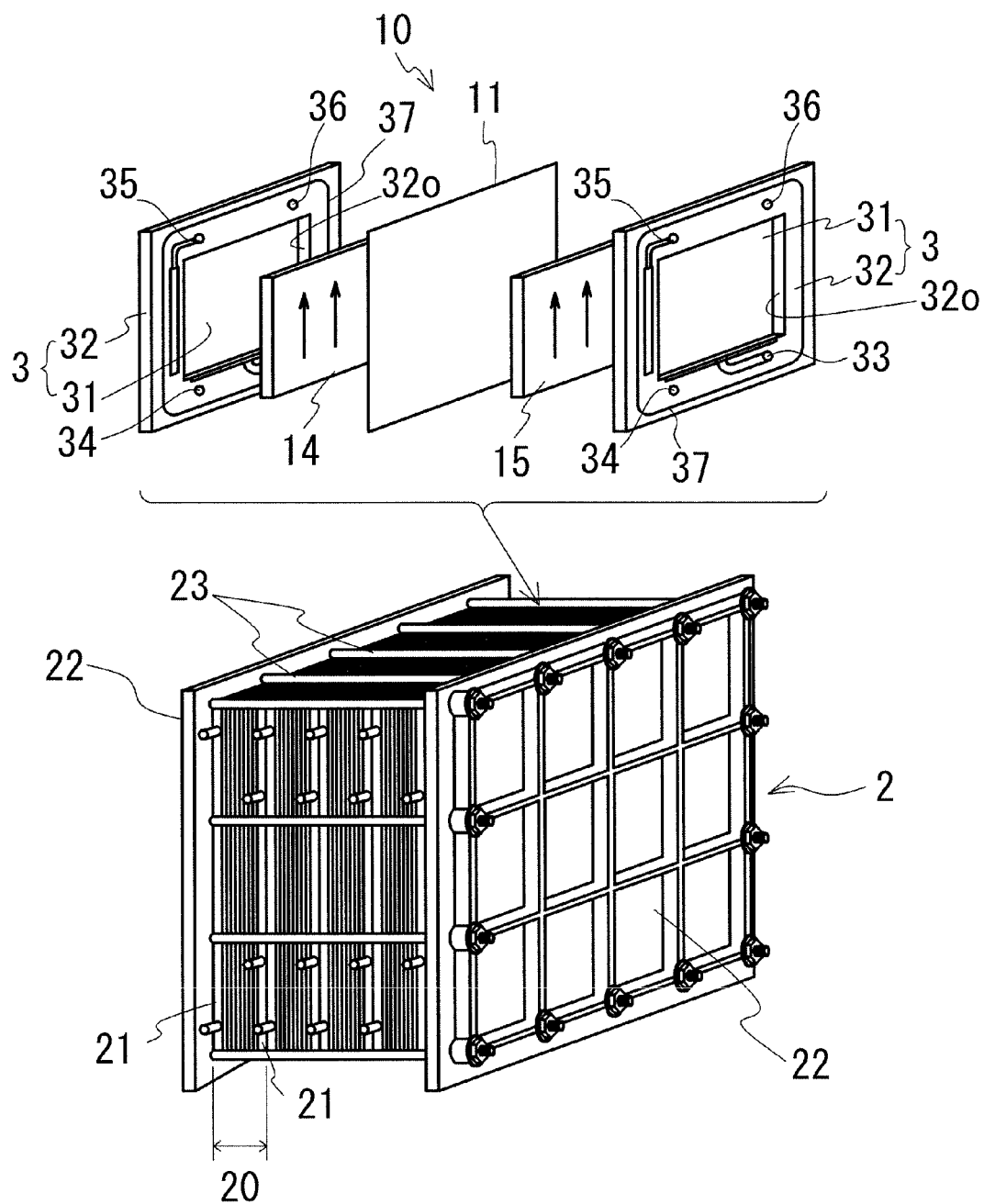
FIG. 3 is a schematic structural view of a cell stack according to the first embodiment.
Figure 4:
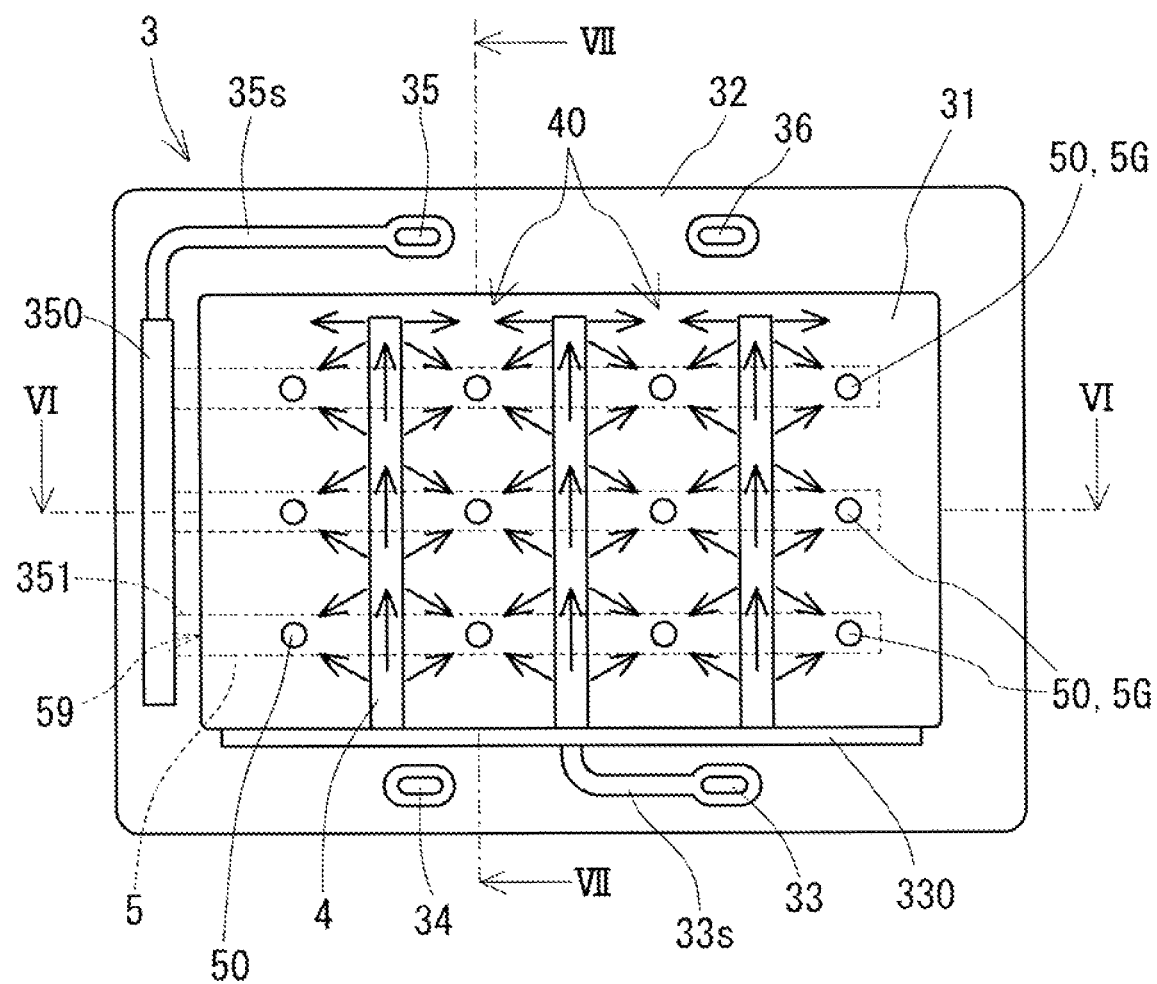
FIG. 4 is a plan view of a cell frame according to the first embodiment as seen from the side of a first surface.
Figure 5:
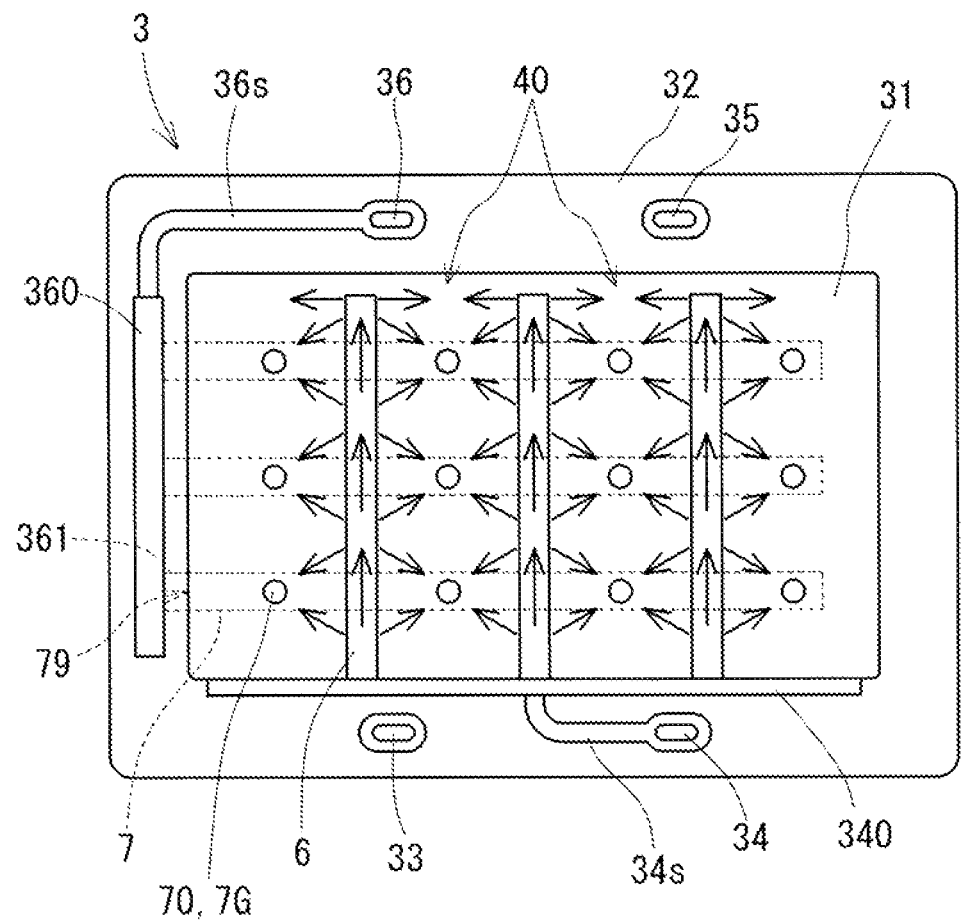
FIG. 5 is a plan view of the cell frame according to the first embodiment as seen from the side of a second surface, which is a surface on the back side of the first surface.

A redox flow battery (hereunder, RF battery) according to an embodiment is described based on FIGS. 1 to 7. The RF battery 1 of the present embodiment shown in FIGS. 1 and 2 includes a cell frame 3 that has a bipolar plate 31 (FIG. 2) according to the embodiment. As shown in FIGS. 4 and 5, one feature of the bipolar plate 31 according to the embodiment is that introduction channels 4 and 6 and discharge channels 5 and 7 are formed at locations in the bipolar plate 31 that differ from each other in a thickness direction. In the present embodiment, first, a general description of the RF battery 1 is given with reference to FIGS. 1 to 3. Thereafter, the bipolar plate 31 according to the embodiment is primarily described in detail with reference to FIGS. 4 to 7.

<<RF Battery>>

The RF battery is one type of storage battery of an electrolyte-circulating type. The principle of operation of the RF battery 1 is shown in FIG. 1. As an example of the RF battery 1, FIG. 1 shows a vanadium-based RF battery that uses a vanadium electrolyte containing V ions in a positive electrolyte and a negative electrolyte. Solid arrows in a cell 10 denote a charging reaction, and dashed arrows denote a discharging reaction. The RF battery 1 is used by being connected to a power system 100 through a power converter 100C, such as an alternating current/direct current converter. The power system 100 includes a power generation unit, a converter facility, and a load, and the power converter 100C is connected to the converter facility. The RF battery 1 is used in, for example, load levelling applications, momentary voltage drop compensation or emergency power supply applications or the like, or levelling applications of the output of natural energy power generation, such as solar power generation or wind power generation. The electrolyte is not limited to a vanadium-based electrolyte. Examples of the electrolyte that is used in the RF battery 1 include an iron-chromium-based electrolyte and a titanium-manganese-based electrolyte.

The RF battery 1 includes a cell 10, where charging and discharging are performed, a positive circulation mechanism 10P that causes the positive electrolyte to circulate in the cell 10, and a negative circulation mechanism 10N that causes the negative electrolyte to circulate in the cell 10.

The cell 10 includes a positive electrode 14, a negative electrode 15, and a membrane 11. The membrane 11 is interposed between the positive electrode 14 and the negative electrode 15. The positive electrode 14 and the negative electrode 15 can be constituted by a carbon fiber aggregate that contains carbon fiber, such as carbon felt, carbon cloth, or carbon paper. The electrodes that are constituted by the carbon fiber aggregate are porous electrodes, and have spaces therein. Therefore, the electrolyte can flow in the electrodes, and can be made to penetrate/spread in the electrodes. The membrane 11 can be constituted by, for example, an ion-exchange membrane in which hydrogen ions permeate.

The positive circulation mechanism 10P (the negative circulation mechanism 10N) includes a supply pipe 16A (17A) that sends the positive electrolyte (the negative electrolyte) from a positive electrolyte tank 16 (a negative electrolyte tank 17) toward the cell 10, and a return pipe 16B (17B) that returns the electrolyte from the cell 10 toward the tank 16 (17). A pump 18 (19) that pressure-feeds the positive electrolyte (the negative electrolyte) that is stored in the tank 16 (17) is provided at the supply pipe 16A (17A), and the positive electrolyte (the negative electrolyte) is caused to circulate in the cell 10 by the pump 18 (19).

<<Cell Stack>>

Ordinarily, as shown in FIG. 2, the cell 10 is used in the form of a so-called cell stack 2 that is formed by stacking a plurality of the cells 10. As shown in FIG. 3, the cell stack 2 is constituted by stacking a plurality of substacks 20 and sandwiching the layered body by two end plates 22. The layered body that is sandwiched by both end plates 22 is fastened by a fastening mechanism 23. The substacks 20 have a structure in which supply/discharge plates 21 (not shown in FIG. 2) are disposed at a layered body in which stacking of the cell frame 3, the positive electrode 14, the membrane 11, and the negative electrode 15 is performed a plurality of times. The supply pipe 16A and the return pipe 16B and the supply pipe 17A and the return pipe 17B of the corresponding circulation mechanisms 10P and 10N (see FIGS. 1 and 2) are connected to the supply/discharge plates 21.

<<Cell Frame>>

Each cell frame 3 has a bipolar plate 31 and a frame body 32 that is provided at an outer periphery of the bipolar plate 31. Each bipolar plate 31 is constituted by, for example, an electrically conductive material, such as plastic carbon. On the other hand, each frame body 32 is made of plastic, such as polyvinyl chloride resin (PVC), polypropylene, polyethylene, fluorine resin, or epoxy resin. Each cell frame 3 can be fabricated by injection molding of each frame body 32 in the vicinity of each bipolar plate 31. Each cell frame 3 can be fabricated by separately fabricating the bipolar plate 31 and the frame body 32 and combining both of the bipolar plate 31 and the frame body 32.

As shown in FIG. 3, recessed portions 32o are formed by each bipolar plate 31 and each frame body 32 on an inner side of each frame body 32. The recessed portions 32o are formed on two sides of each bipolar plate 31. One of the recessed portions 32o accommodates the positive electrode 14, and the other recessed portion 32o accommodates the negative electrode 15. When each cell 10 is assembled, each of the electrodes 14 and 15 is in a compressed state in a thickness direction accommodated in the corresponding recessed portion 32o of each frame body 32. A ring-shaped sealing member 37, such as an O ring or flat packing, that suppresses leakage of an electrolyte is disposed between the frame body 32 of one cell frame 3 and the frame body 32 of another cell frame 3 adjacent to the one cell frame 3. In the cell stack 2 (the substacks 20) formed by stacking a plurality of such cell frames 3, one cell 10 is formed between the bipolar plate 31 of one cell frame 3 and the bipolar plate 31 of another cell frame 3 adjacent to the one cell frame 3.

Figure 6:
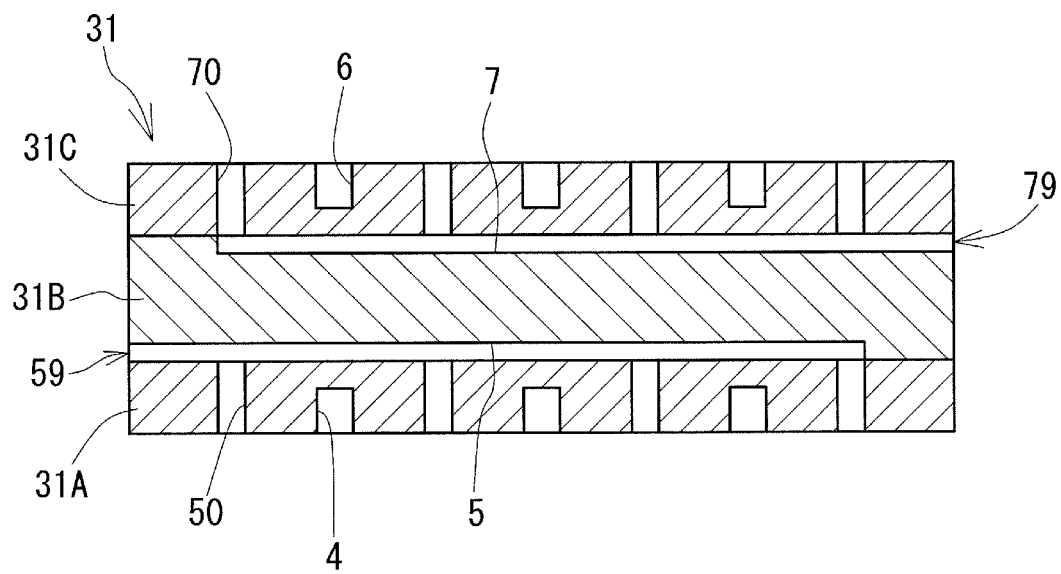
FIG. 6 is a cross sectional view of a bipolar plate shown in FIG. 4.
Figure 7:
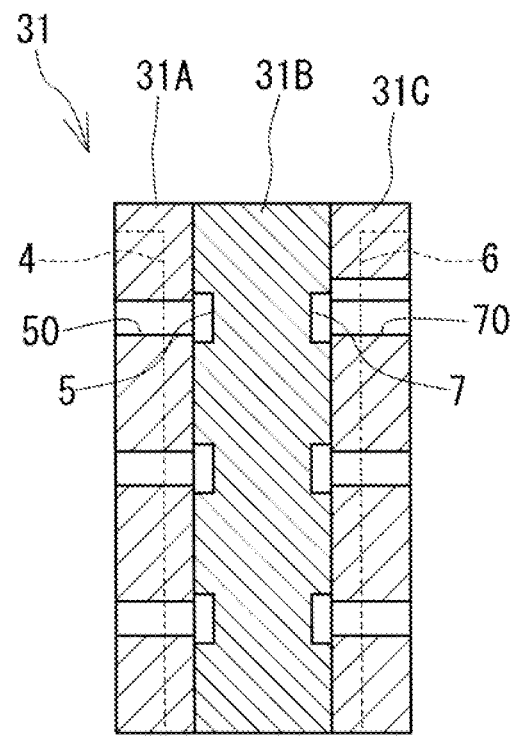
FIG. 7 is a vertical sectional view of the bipolar plate shown in FIG. 4.

Next, a structure of a cell frame 3 is described in detail based on FIGS. 4 to 7. FIG. 4 is a front view of the cell frame 3 on a side at which the positive electrode 14 (FIG. 3) is disposed. FIG. 5 is a front view of the cell frame 3 on a side at which the negative electrode 15 (FIG. 3) is disposed. FIG. 6 is a sectional view (cross sectional view) along VI-VI of the bipolar plate 31 in FIG. 4. FIG. 7 is a sectional view (vertical sectional view) along VII-VII of the bipolar plate 31 in FIG. 4. In FIGS. 6 and 7, the thickness of the bipolar plate 31 is shown in an exaggerated manner. The actual thickness of the bipolar plate 31 is smaller than the illustrated thickness. As shown in FIGS. 4 and 5, the structure of the cell frame 3 on the side of the positive electrode 14 and the structure of the cell frame 3 on the side of the negative electrode 15 are the same.

[Frame Body]

The frame body 32 may have an annular shape or a polygonal shape. The frame body 32 of the present embodiment has a rectangular shape that is long in a left-right direction in a sheet plane. The frame body 32 has liquid supply manifolds 33 and 34 and liquid discharge manifolds 35 and 36, which extend therethrough in a thickness direction thereof. The liquid supply manifold 33 (34) is a hole that supplies a positive electrolyte (a negative electrolyte) to the cell frame 3, and is provided at a lower portion of the frame body 32. On the other hand, the liquid discharge manifold 35 (36) is a hole that discharges the positive electrolyte (the negative electrolyte) from the cell frame 3, and is provided at an upper portion of the frame body 32. Therefore, the direction of the overall flow of the electrolyte at the cell frame 3 (hereunder referred to as "first flow direction") is an upper direction in the sheet plane.

As shown in FIG. 4, the positive electrolyte is supplied to the side of a first surface of the bipolar plate 31 from the liquid supply manifold 33 through a liquid supply slit 33s and an introduction rectifying portion 330. The liquid supply slit 33s is a groove that is formed in a surface of the frame body 32. The introduction rectifying portion 330 is a groove that is provided at an edge portion on an inner peripheral side of the lower portion (rectangular long portion) of the frame body 32, and that extends along the edge portion. Therefore, the positive electrolyte that is introduced into the introduction rectifying portion 330 from the liquid supply slit 33s is spread along the introduction rectifying portion 330 and is introduced to the side of the first surface of the bipolar plate 31. The introduction rectifying portion 330 can also be provided at the bipolar plate 31 described below. In this case, the introduction rectifying portion 330 of the frame body 32 can be omitted.

Liquid discharge from the bipolar plate 31 toward the liquid discharge manifold 35 is performed through liquid discharge holes 351, a discharge rectifying portion 350, and a liquid discharge slit 35s. Each liquid discharge hole 351 is formed in the inside of the frame body 32 and extends in a width direction of the frame body 32 that is orthogonal to the first flow direction. An end portion on an inner side (the side of the bipolar plate 31) of each liquid discharge hole 351 communicates with an outlet 59 of each discharge channel 5 of the bipolar plate 31 described below. An end portion on an outer side of each liquid discharge hole 351 communicates with the discharge rectifying portion 350. The discharge rectifying portion 350 is a groove that is formed in a surface of a side portion (rectangular short portion) of the frame body 32. The discharge rectifying portion 350 has the function of rectifying the flow of the positive electrolyte discharged from the bipolar plate 31 and guiding the positive electrolyte to the liquid discharge slit 35s. The liquid discharge slit 35s is a groove that is formed in the surface of the frame body 32. The liquid discharge slit 35s is narrower in width and shallower in depth than the discharge rectifying portion 350.

As shown in FIG. 5, the negative electrolyte is supplied to the side of the second surface of the bipolar plate 31 from the liquid supply manifold 34 through a liquid supply slit 34s and an introduction rectifying portion 340. The structures of the liquid supply slit 34s and the introduction rectifying portion 340 are the same as the structures of the liquid supply slit 33s and the introduction rectifying portion 330 on the positive side.

Liquid discharge of the negative electrolyte from the bipolar plate 31 toward the liquid discharge manifold 36 is performed through each liquid discharge hole 361, a discharge rectifying portion 360, and a liquid discharge slit 36s. The structures of each liquid discharge hole 361, the discharge rectifying portion 360, and the liquid discharge slit 36s correspond to those of each liquid discharge hole 351, the discharge rectifying portion 350, and the liquid discharge slit 35s on the positive side. Each liquid discharge hole 361, the discharge rectifying portion 360, and the liquid discharge slit 36s may be entirely the same as or at least partly the same as each liquid discharge hole 351, the discharge rectifying portion 350, and the liquid discharge slit 35s on the positive side in terms of disposition, dimensions, and number.

[Bipolar Plate]

As shown in FIG. 4, the positive side of the bipolar plate 31 includes the introduction channels 4, the discharge channels 5, and communication holes 50. The introduction channels 4, the discharge channels 5, and the communication holes 50 constitute flow channels of the positive electrolyte at the bipolar plate 31. As shown in FIG. 5, the negative side of the bipolar plate 31 includes the introduction channels 6, the discharge channels 7, and communication holes 70. The structure of each flow channel of the positive electrolyte and the structure of each flow channel of the negative electrolyte are the same. The description below focuses on the structure of each flow channel of the positive electrolyte with reference to FIGS. 4, 6, and 7. When FIG. 5 is referred to and "positive electrolyte", "introduction channels 4", "discharge channels 5", "communication holes 50", "communication hole group 5G", and "outlets 59" are read as "negative electrolyte", "introduction channels 6", "discharge channels 7", "communication holes 70", "communication hole group 7G", and "outlets 79", respectively, the structure of each flow channel of the negative electrolyte is described.

[[Introduction Channels]]

The introduction channels 4 have the role of spreading a positive electrolyte over the entire surface of the bipolar plate 31 on the side of the first surface and introducing the electrolyte to the positive electrode 14 that is disposed on the side of the first surface of the bipolar plate 31. The introduction channels 4 are flow channels in which, when the bipolar plate 31 is the cell frame 3, one end of the introduction channels 4 is disposed at or near an introduction location at which the positive electrolyte is introduced to the bipolar plate 31 and the other end of the introduction channels 4 is disposed away from the introduction location. The introduction channels 4 of the present embodiment are groove-like flow channels (vertical grooves) that are formed in a surface of the bipolar plate 31 and that extend from the introduction side at which the positive electrode is introduced (the side of the liquid supply manifold 33) toward a discharge side (the side of the liquid discharge manifold 35). Three vertical grooves of the present embodiment extend in a straight manner in the first flow direction. When such vertical grooves are used, as shown by thick arrows in FIG. 4, the positive electrolyte moves along the vertical grooves and spreads in a direction that intersects the extension direction of the vertical grooves. As a result, the positive electrolyte is uniformly supplied to the surface of the bipolar plate 31.

As vertical grooves that differ from those of the present embodiment, it is possible to use vertical grooves that meander in a zigzag manner. In addition, the vertical grooves may be inclined with respect to the first flow direction. In this case, it is desirable that the inclination angle of the vertical grooves be 30° or less. Further, the introduction channels 4 may include at least one of a lateral groove and a rectifying groove in addition to the vertical grooves. The lateral groove is a groove-like flow channel that extends in a direction that intersects the extension direction of the vertical grooves. The lateral groove may be provided so as to connect adjacent vertical grooves. The rectifying groove is a lateral groove that is provided along the lower portion of the frame body 32 at the surface of the bipolar plate 31. When the rectifying groove is provided, the introduction rectifying portion 330 of the frame body 32 may be omitted.

End portions of the introduction channels 4 in the extension direction thereof may or may not reach the lower portion of the frame body 32. In the present embodiment, the end portions of the introduction channels 4 on the introduction side reach the lower portion of the frame body 32, and the end portions of the introduction channels 4 on the discharge side do not reach the upper portion of the frame body 32. As described in a third embodiment below, the end portions on the discharge side of the vertical grooves that constitute the introduction channels 4 may be connected to each other by lateral grooves that extend in a lateral direction in the sheet plane. The introduction channels 4 may also have a lattice shape that includes lateral grooves that connect in the lateral direction portions of the vertical grooves other than the end portions, that is, intermediate portions, in particular, portions between adjacent communication holes 50 that constitute a communication hole group 5G.

[[Discharge Channels]]

The discharge channels 5 have the role of discharging a positive electrolyte from the bipolar plate 31. The discharge channels 5 of the present embodiment are pipe-like flow channels that are formed in the inside of the bipolar plate 31. The discharge channels 5 may extend in a direction along the introduction channels 4, or in a direction that intersects the introduction channels 4. Three discharge channels 5 of the present embodiment are lateral holes that extend in a direction that is orthogonal to the introduction channels 4. By causing the extension direction of the discharge channels 5 to intersect the extension direction of the introduction channels 4, the bending rigidity of the bipolar plate 31 is increased.

When each discharge channel 5 is a pipe-like flow channel that is formed in the inside of the bipolar plate 31, it is possible to quickly collect a reacted electrolyte from the surface of the bipolar plate 31. As a result, it is possible to suppress the battery reaction at the electrode 14 (FIG. 3, etc.) that is disposed at the surface of the bipolar plate 31 from being hindered by the reacted electrolyte.

At least one of the one end portion and the other end portion of each discharge channel 5 in the extension direction reaches the frame body 32. This is because it is necessary to discharge the positive electrolyte from the bipolar plate 31 to the liquid discharge manifold 35 of the frame body 32. In the present embodiment, a left end portion in the sheet plane of each discharge channel 5 (each outlet 59) is connected to a corresponding one of the liquid discharge holes 351. On the other hand, a right end portion in the sheet plane of each discharge channel 5 in FIG. 4 does not reach the frame body 32 (also see FIG. 6). As described in a fourth embodiment below, when the right end portion in the sheet plane of each discharge channel 5 reaches the frame body 32, it is desirable that liquid discharge holes 351, a discharge rectifying portion 350, and a liquid discharge slit 35s also be provided at a right portion of the frame body 32.

As described in the third embodiment below, the right end portions in the sheet plane of the lateral holes that constitute the discharge channels 5 may be connected to each other by vertical holes that extend in a vertical direction in the sheet plane. The discharge channels 5 may also have a lattice shape that includes vertical holes that connect in the vertical direction portions of the lateral holes other than the end portions, that is, intermediate portions, in particular, portions between adjacent communication holes 50 in the lateral direction in the sheet plane.

[[Communication Holes]]

The communication holes 50 communicate with a corresponding one of the discharge channels 5 (the pipe-like flow channels) from the surface of the bipolar plate 31. The communication holes 50 have the role of collecting a reacted electrolyte from the surface of the bipolar plate 31 and guiding the electrolyte to the corresponding one of the discharge channels 5. It is desirable that the communication holes 50 extend in a straight manner in the thickness direction (the depth direction in the sheet plane) of the bipolar plate 31.

The opening shape of each communication hole 50 is not particularly limited. For example, the opening shape of each communication hole 50 may be a slit-like rectangular shape or a circular shape as illustrated in the figures. By adjusting the number and opening area of the communication holes 50, the flow resistance of a positive electrolyte at the bipolar plate 31 is adjusted.

It is desirable that at least one communication hole 50 be provided in each inter-groove region 40 that is interposed between two groove-like flow channels (the introduction channels 4 in the present embodiment) that are adjacent to each other. As described in the present embodiment, it is desirable that communication hole groups 5G be provided at the inter-groove regions 40. Communication hole group 5G is a general term for a plurality of communication holes 50 that are disposed side by side in a direction along the groove-like flow channels 4.

In addition, it is desirable that at least one communication hole 50 be provided in each of a one side region and the other side region that are disposed on two sides of each groove-like flow channel (each introduction channel 4 in the present embodiment). As described in the present embodiment, it is desirable that a communication hole group 5G be provided in each of the one side region (left region in the sheet plane) and the other side region (right region in the sheet plane) that are disposed on two sides of each groove-like flow channel 4.

[[Advantageous Effects]]

According to the bipolar plate 31 of the present embodiment, even if the number of introduction channels 4 and 6 and the number of discharge channels 5 and 7 are made large, it is also possible to suppress an increase in the amount of electrolyte that is discharged from the bipolar plate 31 before a reaction. This is because, in the bipolar plate 31 of the embodiment, since the introduction channels 4 (6) and the discharge channels 5 (7) exist at locations that differ from each other in the thickness direction of the bipolar plate, the flow of the electrolyte between the introduction channels 4 (6) and the discharge channels 5 (7) is easily adjusted. In addition, that the flow of the electrolyte is easily adjusted due to the number of communication holes 50 (70) that communicate with the discharge channels 5 (7) from the surface of the bipolar plate 31 is a factor that makes it possible to suppress an increase in the amount of unreacted electrolyte. If the bipolar plate 31 of this embodiment is used, it is possible to cause the electrolyte to undergo sufficient battery reaction and to quickly collect the reacted electrolyte, as a result of which it is possible to fabricate the RF battery 1 (FIGS. 1 and 2) having excellent charge and discharge efficiency.

In the bipolar plate 31 of the embodiment, when the number of introduction channels 4 and 6 is made large, it is possible to quickly spread the electrolyte over the entire surface of the bipolar plate 31, and to uniformly supply the electrolyte to the entire surfaces of the electrodes 14 and 15 (for example, FIG. 3) that face the bipolar plate 31. In addition, when the number of discharge channels 5 and 7 is made large, it is possible to quickly collect the reacted electrolyte from the entire surfaces of the electrodes 14 and 15. When the number of discharge channels 5 and 7 is large, it is possible to reduce pressure loss when the electrolyte flows, as a result of which it is possible to reduce the output of the pumps 18 and 19 (see FIGS. 1 and 2) that cause the electrolyte to circulate. As a result, it is possible to reduce the power consumption amount when the RF battery 1 (FIGS. 1 and 2) operates.

In addition, according to the bipolar plate 31 of the present embodiment, gas that is generated by the battery reaction of the electrolyte or gas that is originally mixed in the electrolyte easily comes out of the inside of the cell 10 (FIGS. 1 and 2). This is because the communication holes 50 (70) open in the surface of the bipolar plate 31 that contacts the electrode 14 (15) and the communication holes 50 (70) are connected to a corresponding one of the discharge channels 5 (7). The gas of the electrode 14 (15) is quickly discharged to the discharge channels 5 (7) through the communication holes 50 (70) and is unlikely to be retained in the inside of the cell 10. Therefore, it is possible to suppress problems, such as a reduction in the contact area of the electrolyte with the electrodes 14 and 15 due to the gas.

[[Other]]

The number of groove-like flow channels (introduction channels 4 and 6) and the number of pipe-like flow channels (discharge channels 5 and 7) can be selected as appropriate. Although the number of groove-like flow channels and the number of pipe-like flow channels are each three in the present embodiment, they may be two or less or four or more. By increasing the number of groove-like flow channels and the number of pipe-like flow channels, it is possible to reduce the flow resistance of an electrolyte. It is desirable that the communication holes 50 and 70 be provided at least at locations on two sides of a corresponding one of the groove-like flow channels.

It is desirable that the interval between two groove-like flow channels that are adjacent to each other and the interval between two pipe-like flow channels that are adjacent to each other be 2 mm or greater and 20 mm or less. When the interval is 2 mm or greater, the mechanical strength of the bipolar plate 31 is easily ensured. In addition, when the interval is 20 mm or less, an electrolyte easily spreads over the entire surface of the bipolar plate 31. Further, it is desirable that the interval between two pipe-like flow channels be 2 mm or greater and 10 mm or less.

The sectional shape of the groove-like flow channels that is orthogonal to the extension direction thereof is not particularly limited. Although the sectional shape of the groove-like flow channels of the present embodiment is a rectangular shape, the sectional shape may be a V shape or a semicircular shape. In addition, the sectional shape of the pipe-like flow channels is not particularly limited. Although the sectional shape of the pipe-like flow channels of the present embodiment is a rectangular shape, the sectional shape may be a circular shape.

The width of the groove-like flow channels is not particularly limited. An example of the width of the groove-like flow channels is 0.5 mm or greater and 7.0 mm or less. Further, an example of the width of the groove-like flow channels is 0.8 mm or greater and 3.5 mm or less.

The depth of the groove-like flow channels is not particularly limited. An example of the depth of the groove-like flow channels is 0.5 mm or greater and 7.0 mm or less. Further, an example of the depth of the groove-like flow channels is 1.0 mm or greater and 3.5 mm or less. The depth of the groove-like flow channels in the present description refers to the length from the surface of the bipolar plate 31 to the deepest portion of each groove-like flow channel.

The sectional area of the groove-like flow channels that is orthogonal to the extension direction of the groove-like flow channels may be 0.5 mm$^2$ or greater and 35 mm$^2$ or less. Further, the sectional area of the groove-like flow channels may be 1 mm$^2$ or greater and 10 mm$^2$ or less, or may be 2 mm$^2$ or greater and 6 mm$^2$ or less. By making the sectional area large, although the flow resistance of an electrolyte can be reduced, the strength of the bipolar plate 31 is reduced. Considering the balance between the flow resistance of the electrolyte and the strength of the bipolar plate 31, the sectional area of the groove-like flow channels is determined.

On the other hand, it is desirable that the sectional shape of the pipe-like flow channels that is orthogonal to the extension direction of the pipe-like flow channels be a shape that is as simple as possible. This is because, when the sectional shape of the pipe-like flow channels becomes complicated, it is not easy to form the sectional shape and the flow resistance of an electrolyte tends to become large. Although the sectional shape of the pipe-like flow channels is a rectangular shape (including a square shape) shown in the present embodiment, the sectional shape may be a circular shape.

The sectional area of the pipe-like flow channels may the same as or smaller than or greater than the sectional area of the groove-like flow channels. It is desirable that the sectional area of the pipe-like flow channels be 0.5 mm$^2$ or greater and 35 mm$^2$ or less. It is more desirable that the sectional area of the pipe-like flow channels be 1 mm$^2$ or greater and 10 mm$^2$ or less, and even more desirable that the sectional area of the pipe-like flow channels be 2 mm$^2$ or greater and 6 mm$^2$ or less.

[[Fabricating Method]]

As shown in FIGS. 6 and 7, the bipolar plate 31 of the present embodiment is fabricated by attaching three division plates 31A, 31B, and 31C to each other in the thickness direction. In this case, first, planar division plates 31A, 31B, and 31C are prepared. Vertical grooves, which become introduction channels 4 (6), are formed on the side of a first surface of the division plate 31A (31C) by, for example, machining. Lateral grooves, which become discharge channels 5 (7), are formed in both surfaces of the division plate 31B. Next, through holes are formed by, for example, hole drilling at locations of the division plate 31A (31C) corresponding to the locations of the lateral grooves of the division plate 31B. Lastly, the division plates 31A, 31B, and 31C are joined to each other by sandwiching the division plate 31B by a second surface of the division plate 31A and a second surface of the division plate 31C. Spaces that are surrounded by the lateral grooves of the division plate 31B and the second surface of the division plate 31A become the discharge channels 5, and the through holes of the division plate 31A become communication holes 50. In addition, spaces that are surrounded by the lateral grooves of the division plate 31B and the second surface of the division plate 31C become the discharge channels 7, and the through holes of the division plate 31C become communication holes 70. Unlike the present embodiment, it is possible to provide the vertical grooves, the lateral grooves, and the through holes in the division plates 31A and 31C, and to form the division plate 31B as an unprocessed plate material.

<<Advantageous Effect of RF Battery>>

By using the cell frame 3 of the present embodiment described with reference to FIGS. 4 to 7, it is possible to improve the battery performance of the RF battery 1. This is because the charge and discharge efficiency of an electrolyte is increased by the bipolar plate 31 of the cell frame 3. In addition, that the consumption power when the RF battery 1 is operating can be reduced by the bipolar plate 31 contributes to improving the battery performance of the RF battery 1.

Second Embodiment

Figure 8:
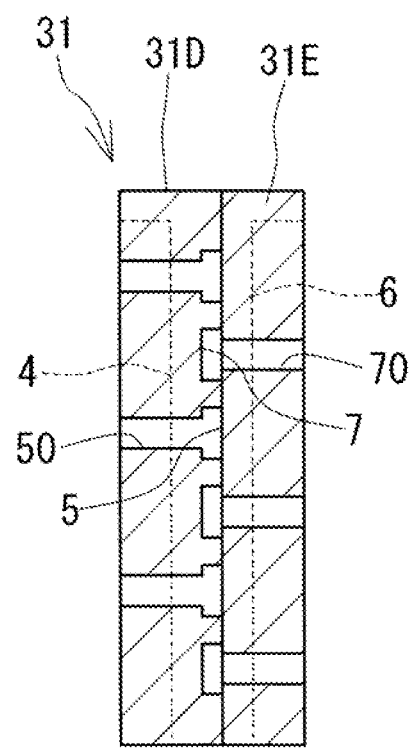
FIG. 8 is a vertical sectional view of a bipolar plate according to a second embodiment.

In the first embodiment, as shown in FIGS. 6 and 7, the bipolar plate 31 that is constituted by three division plates 31A, 31B, and 31C has been described. In contrast, in a second embodiment, a bipolar plate 31 fabricated by combining two division plates 31D and 31E is described based on FIG. 8. FIG. 8 is a vertical sectional view of the bipolar plate 31 of the second embodiment that has been cut at a location that is the same as the location of the cross section along VII-VII in FIG. 4.

As shown in FIG. 8, the bipolar plate 31 of the present embodiment is constituted by attaching two division plates 31D and 31E. More specifically, lateral grooves, which become discharge channels 5, and lateral grooves, which become discharge channels 7, are alternately formed in a surface of the division plate 31D facing the division plate 31E. Further, vertical grooves, which become introduction channels 4, and communication holes 50 that extend through the discharge channels 5 are formed in a surface of the division plate 31D opposite to the lateral grooves. On the other hand, vertical grooves, which become introduction channels 6, and through holes, which become communication holes 70, are formed in the division plate 31E. By joining such division plates 31D and 31E to each other, the bipolar plate 31 shown in FIG. 8 is fabricated. In the bipolar plate 31, the discharge channels 5 on the positive side and the discharge channels 7 on the negative side are formed at corresponding locations in a thickness direction thereof.

According to the structure of the present embodiment, since the number of components that constitute the bipolar plate 31 is two, the productivity in terms of the bipolar plate 31 of the second embodiment is higher than the productivity in terms of the bipolar plate 31 of the first embodiment. In addition, the thickness of the bipolar plate 31 of the second embodiment is easily made smaller than the thickness of the bipolar plate 31 of the first embodiment.

Third Embodiment

Figure 9:
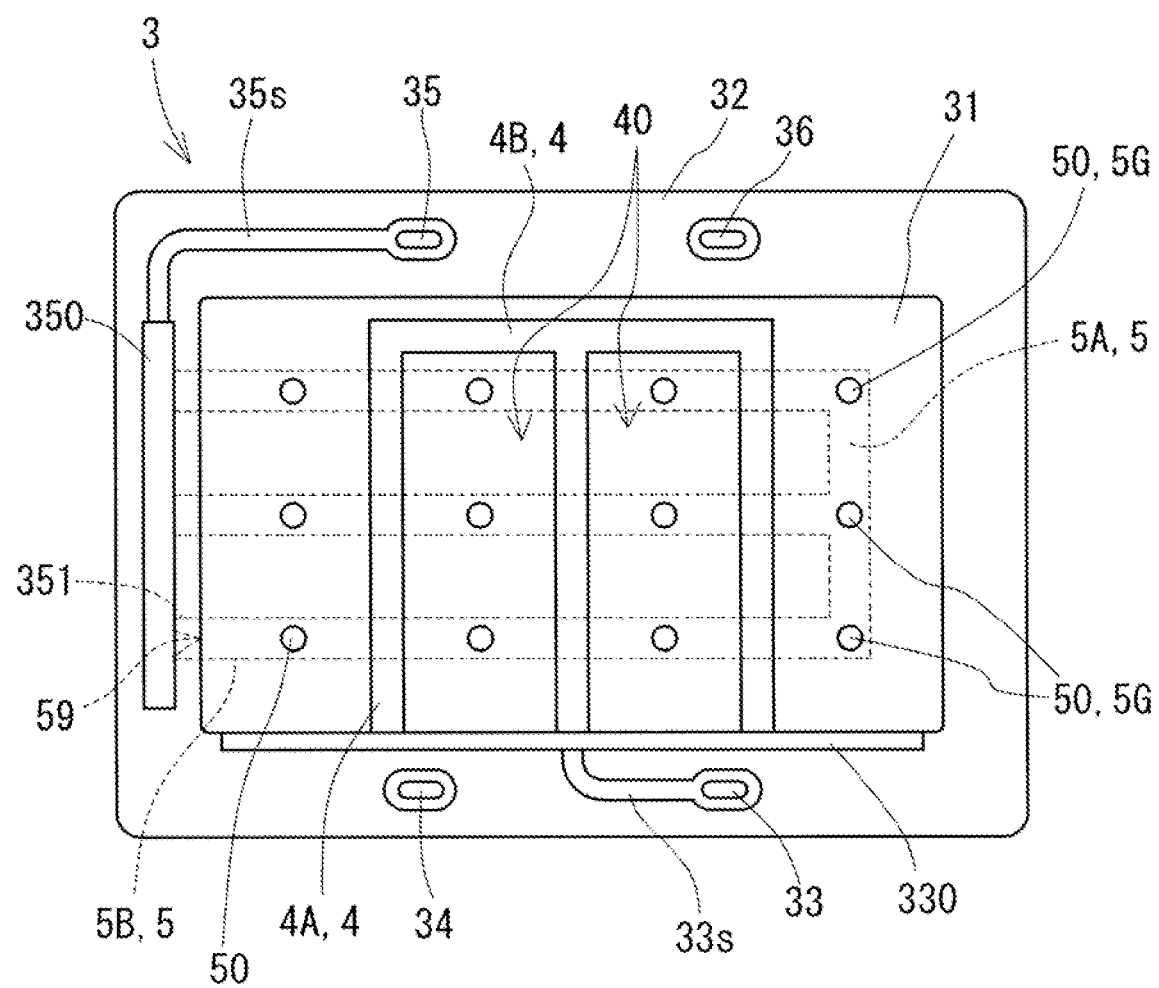
FIG. 9 is a plan view of a cell frame according to a third embodiment as seen from the side of a first surface.

In the structure of the first embodiment, lateral grooves that in the lateral direction connect end portions of a plurality of vertical grooves that constitute an introduction channel 4 may be provided. In addition, in the structure of the first embodiment, vertical holes that connect in the vertical direction end portions of a plurality of lateral holes that constitute a discharge channel 5 may be provided. In the third embodiment, a bipolar plate 31 including both the lateral grooves and the vertical holes is described based on FIG. 9.

The introduction channel 4 of the present embodiment includes a plurality of vertical grooves 4A and a lateral groove 4B that connects end portions of the plurality of vertical grooves 4A to each other. The lateral groove 4B causes an electrolyte to spread in the lateral direction (the direction in which the vertical grooves 4A are disposed in parallel) at the locations of the end portions of the vertical grooves 4A. Therefore, an electrolyte easily spreads over the entire surface of the bipolar plate 31.

The discharge channel 5 of the present embodiment includes a plurality of lateral holes 5B and a vertical hole 5A that connects end portions of the plurality of lateral holes 5B to each other. The vertical hole 5A that connects all of the lateral holes 5B suppresses a large amount of electrolyte from flowing to a particular lateral hole 5B. Therefore, according to the structure of the present embodiment, the ability to discharge the electrolyte at the discharge channel 5 is increased.

Fourth Embodiment

Figure 10:
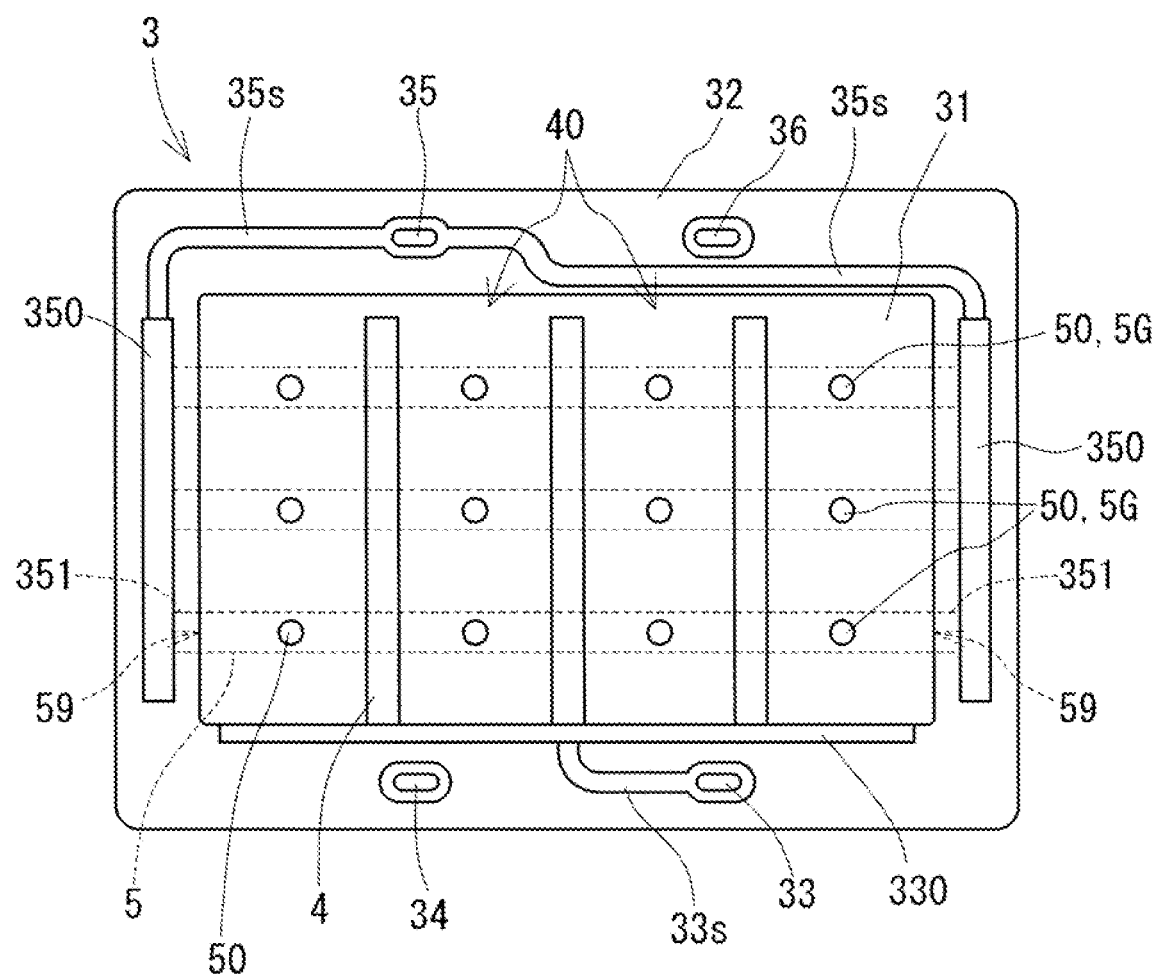
FIG. 10 is a plan view of a cell frame according to a fourth embodiment as seen from the side of a first surface.

In the fourth embodiment, an example in which an electrolyte is discharged from both sides of a bipolar plate 31 in a width direction is described based on FIG. 10.

In the bipolar plate 31 of the present embodiment, not only one end portion (left end portion in a sheet plane) of each discharge channel 5 in an extension direction, but also the other end portion (right end portion in the sheet plane) reaches a frame body 32. Therefore, liquid discharge holes 351, a discharge rectifying portion 350, and a liquid discharge slit 35s are also provided in a right side portion in the sheet plane of the frame body 32 of the present embodiment. The right liquid discharge slit 35s in the sheet plane is bent so as to circumvent a liquid discharge manifold 36. In the structure of the present embodiment, the number of outlets 59 of the discharge channels 5 is twice that of the structure of the first embodiment. Therefore, according to the structure of the present embodiment, the ability to discharge an electrolyte at each discharge channel 5 is increased.

Fifth Embodiment

Figure 11:
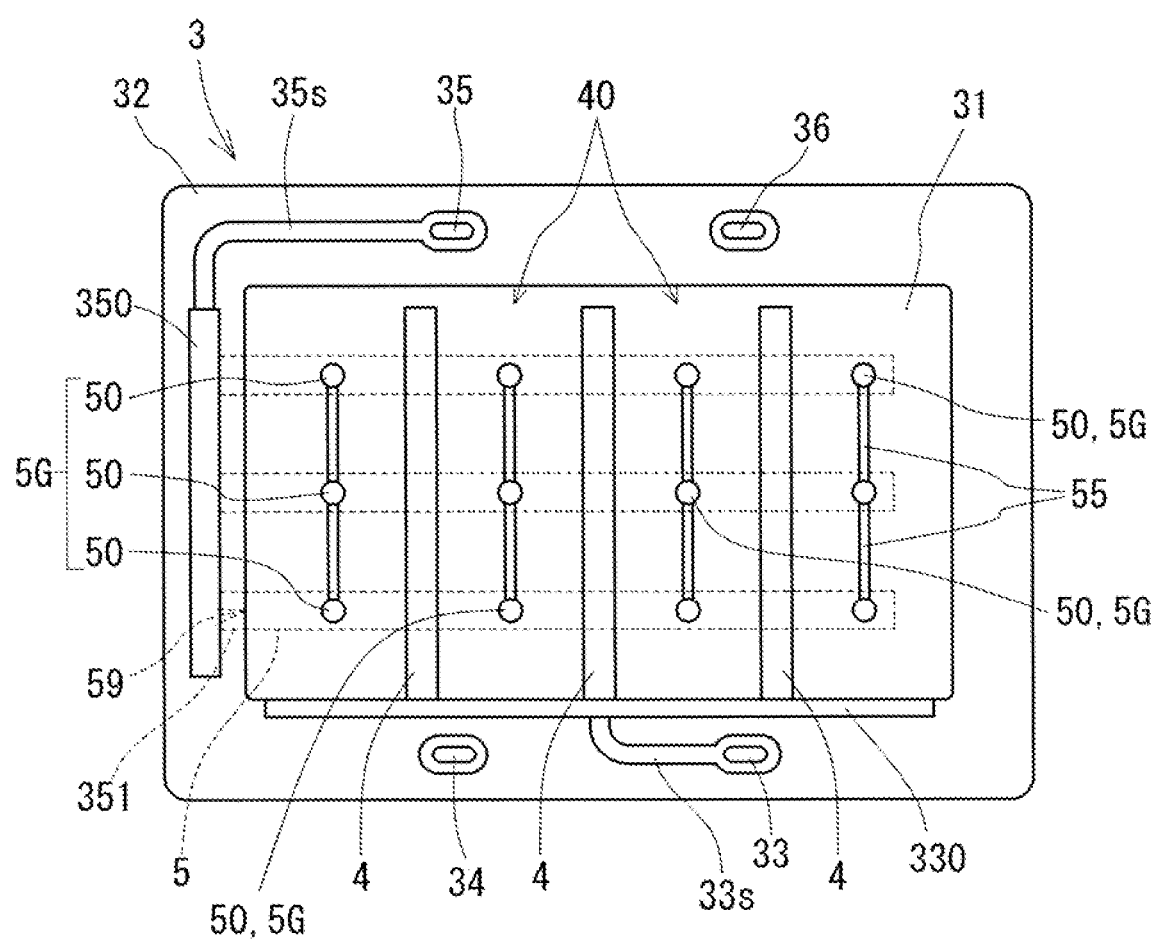
FIG. 11 is a plan view of a cell frame according to a fifth embodiment as seen from the side of a first surface.

In a fifth embodiment, a bipolar plate 31 in which communication holes 50 are connected to each other by link grooves 55 is described based on FIG. 11. The structure of the bipolar plate 31 of the fifth embodiment is the same as that of the first embodiment except in the link grooves 55.

As shown in FIG. 11, each link groove 55 connects two communication holes 50 and 50 that are close to each other in one communication hole group 5G. The width of each link groove 55 of the present embodiment is smaller than the diameter of an opening portion of each communication hole 50. Naturally, the width of each link groove 55 may be the same as or larger than the diameter of the opening portion of each communication hole 50. By providing the link grooves 55, an electrolyte that has spread in a planar direction of the bipolar plate 31 is easily discharged to the communication holes 50 through the link grooves 55. Therefore, the electrolyte after a battery reaction is quickly discharged from a surface of the bipolar plate 31, and the electrolyte after the battery reaction is unlikely to be retained at electrodes 14 and 15 (FIG. 3). As a result, the charge and discharge efficiency of a battery cell 10 (FIG. 3) is improved.

<<Modification 5-1>>

Figure 12:
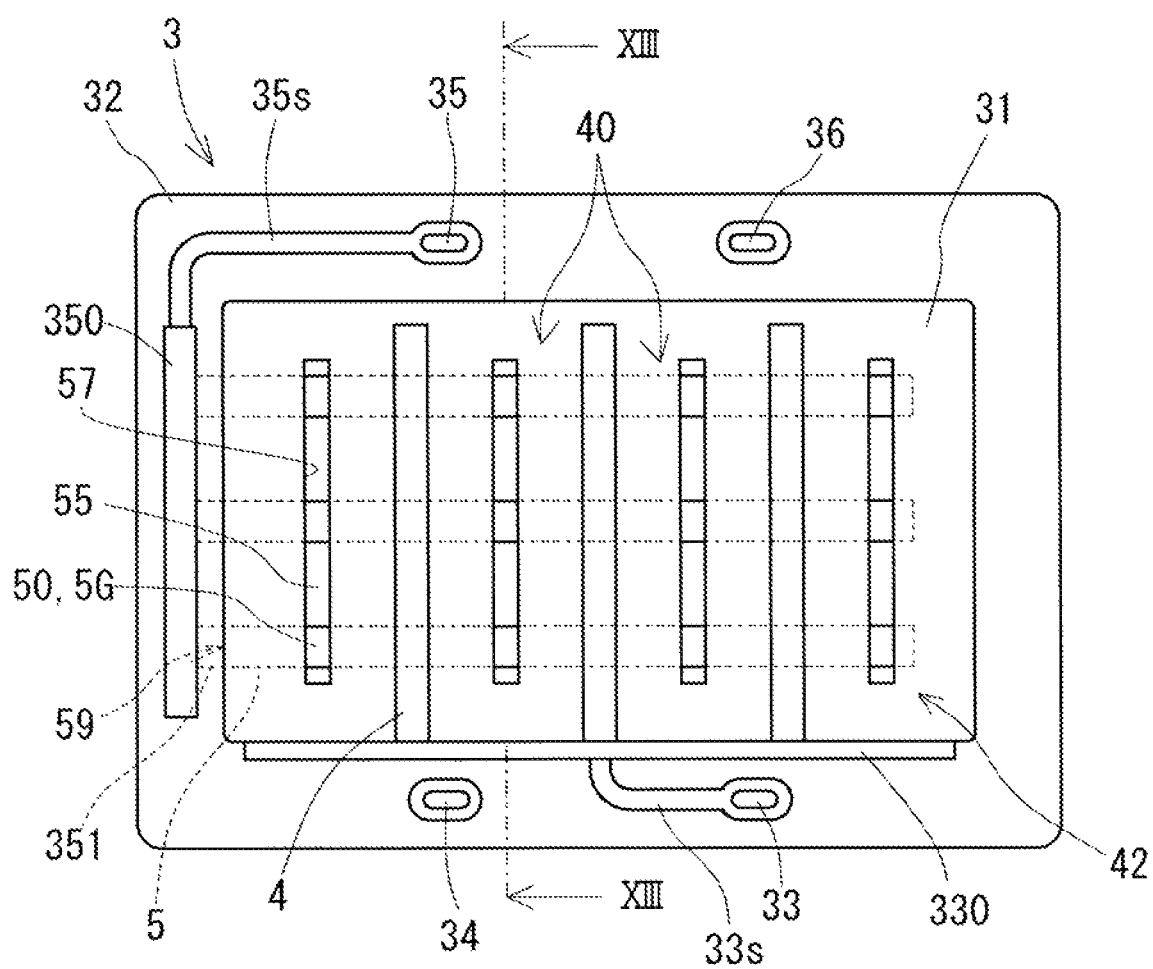
FIG. 12 is a plan view of a cell frame according to Modification 5-1 as seen from the side of a first surface.

As a modification of the fifth embodiment, a bipolar plate 31 in which long grooves 57 are formed in a surface of the bipolar plate 31 is described based on FIG. 12. The structure of the bipolar plate 31 of Modification 5-1 is the same as that of the bipolar plate of the fifth embodiment except in the long grooves 57.

As shown in FIG. 12, the bipolar plate 31 of the present embodiment includes the long grooves 57 that extend in a direction along groove-like flow channels 4. The long grooves 57 are not connected to a lower edge (introduction rectifying portion 330) and an upper edge of the bipolar plate 31. More specifically, an upper end of each long groove 57 extends on the side of an upper edge beyond a discharge channel 5 (pipe-like flow channel) that exists on the side of an upper edge of the bipolar plate 31. A lower end of each long groove 57 extends on the side of a lower edge beyond a discharge channel 5 (pipe-like flow channel) that exists on the side of a lower edge of the bipolar plate 31. Portions of each long groove 57 that overlap the pipe-like flow channels 5 function as communication holes 50. The opening shape of the communication holes 50 is a rectangular shape. On the other hand, portions of each long groove 57 that do not overlap the pipe-like flow channels 5 function as link grooves 55. The width (the length in a left-right direction in a sheet plane) of the link grooves 55 is the same as the width of the communication holes 50.

Figure 13:
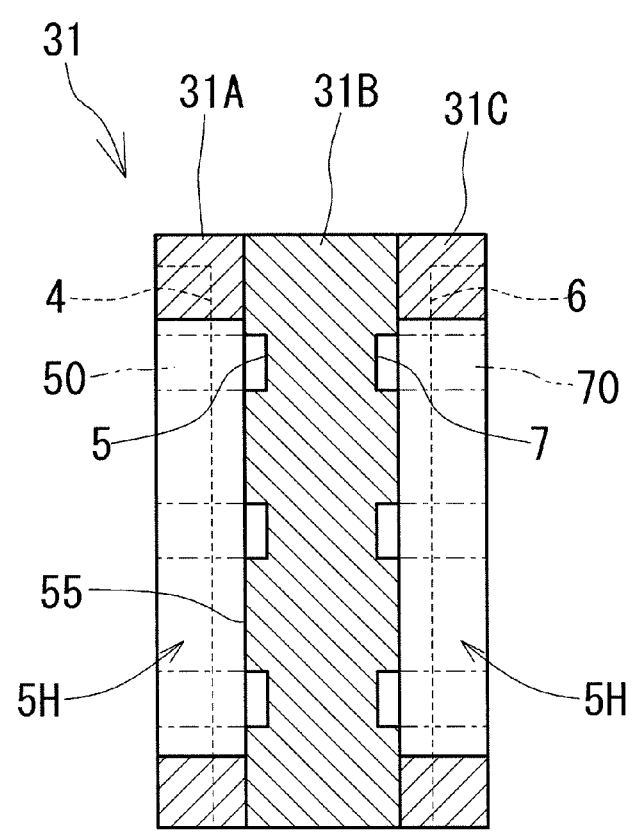
FIG. 13 is a vertical sectional view of a bipolar plate shown in FIG. 12.

An example of a method of fabricating the bipolar plate 31 of the present modification is described based on FIG. 13. As shown in FIG. 13, first, planar division plates 31A, 31B, and 31C are prepared. By, for example, machining, vertical grooves, which become introduction channels 4 (6), are formed on the side of a first surface of the division plate 31A (31C) and long holes 5H that extend through the division plates 31A and 31C are formed. In addition, lateral grooves, which become discharge channels 5, are formed in both surfaces of the division plate 31B. Lastly, the division plates 31A, 31B, and 31C are joined to each other by sandwiching the division plate 31B by a second surface of the division plate 31A and a second surface of the division plate 31C. In this case, spaces that are surrounded by the long holes 5H and the division plate 31B become the long grooves 57 in FIG. 12.

The productivity in terms of the bipolar plate 31 of the present modification is higher than the productivity in terms of the bipolar plate 31 of the third embodiment. In the bipolar plate 31 of the fifth embodiment shown in FIG. 11, the communication holes 50 and the link grooves 55 are processed separately. In contrast, in the bipolar plate 31 of the present modification, the communication holes 50 and the link grooves 55 are formed only by forming the long holes 5H in the division plates 31A and 31B. In addition, in the bipolar plate 31 of the present modification, precision of the positions of formation of the long holes 5H is not excessively required. This is because the communication holes 50 are formed as long as the long holes 5H intersect the lateral grooves of the division plate 31B.

Sixth Embodiment

In the first embodiment to the fifth embodiment, and the modification, the introduction channels 4 and 6 are vertical grooves along the first flow direction of an electrolyte and the discharge channels 5 and 7 are lateral holes that intersect (are orthogonal to) the first flow direction. In contrast, it is possible to form the introduction channels 4 and 6 and the discharge channels 5 and 7 as follows.

Example 1: the introduction channels 4 and 6 are lateral holes (pipe-like flow channels), and the discharge channels 5 and 7 are vertical grooves (groove-like flow channels)

Example 2: the introduction channels 4 and 6 are vertical holes (pipe-like flow channels), and the discharge channels 5 and 7 are lateral grooves (groove-like flow channels)

Example 3: the introduction channels 4 and 6 are lateral grooves (groove-like flow channels), and the discharge channels 5 and 7 are vertical holes (pipe-like flow channels)

Even the structures of Examples 1 to 3 above can provide advantageous effects that are the same as those of the first embodiment.

Seventh Embodiment

Figure 14:
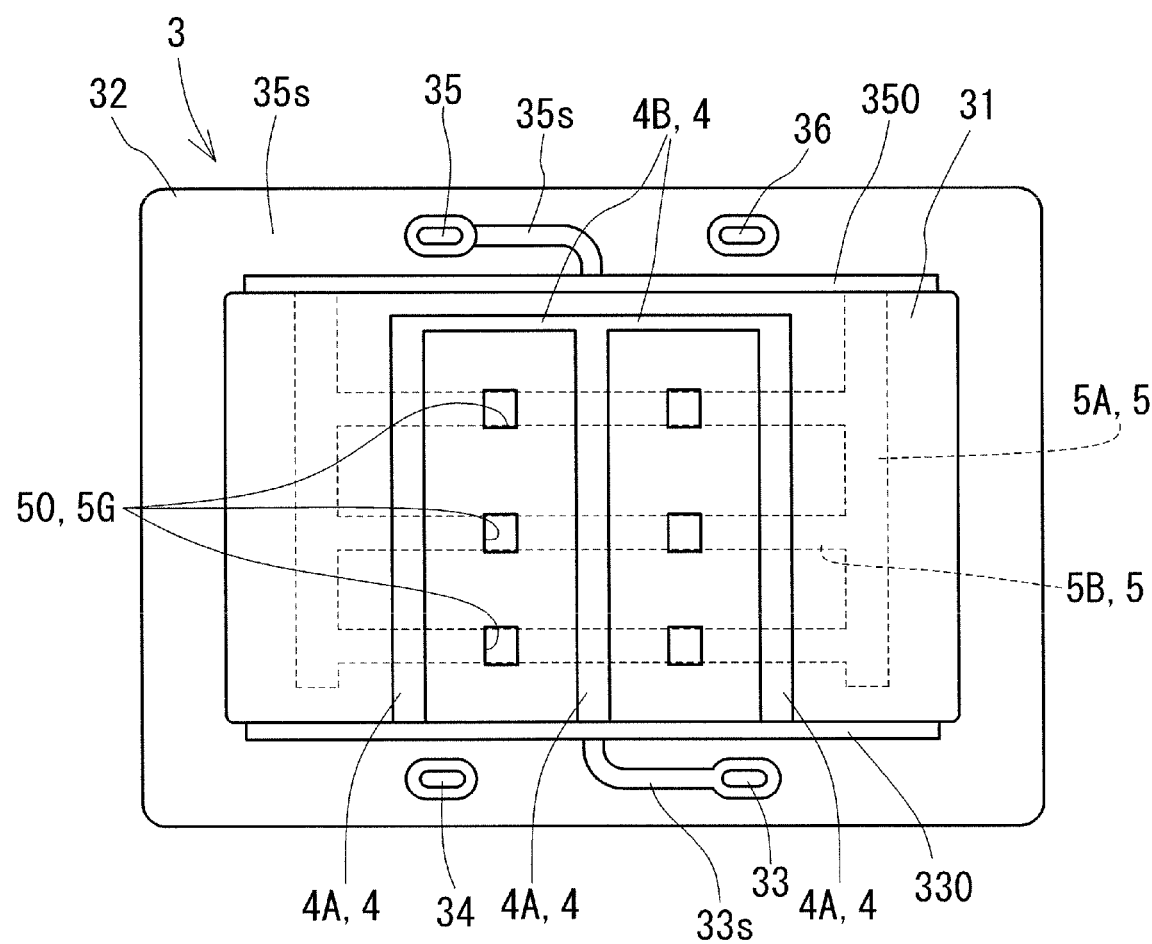
FIG. 14 is a plan view of a cell frame according to a seventh embodiment as seen from the side of a first surface.

In a seventh embodiment, a structure that discharges an electrolyte that flows in a discharge channel 5 to the side of an upper portion of a frame body 32 is described based on FIG. 14.

An introduction channel 4 of the present embodiment has a structure that is the same as the structure of the introduction channel (FIG. 9) of the third embodiment. That is, the introduction channel 4 of the present embodiment includes a plurality of vertical grooves 4A and a lateral groove 4B that connects end portions of the vertical grooves 4A to each other.

On the other hand, the discharge channel 5 of the present embodiment includes a plurality of lateral holes 5B and a pair of left and right vertical holes 5A. Communication holes 50 that open in a surface of the bipolar plate 31 are provided at the lateral holes 5B. The left vertical hole 5A in a sheet plane causes left end portions in the sheet plane of the plurality of lateral holes 5B to communicate with each other. The right vertical hole 5A in the sheet plane causes right end portions in the sheet plane of the plurality of lateral holes 5B to communicate with each other. A lower end portion in the sheet plane (the side of liquid supply manifolds 33 and 34) of each vertical hole 5A does not reach the frame body 32. On the other hand, an upper end portion in the sheet plane of each vertical hole 5A (the side of liquid discharge manifolds 35 and 36) reaches the frame body 32. In the frame body 32 of the present embodiment, a discharge rectifying portion 350 is provided at a location of an upper portion of the frame body 32. The upper end portion in the sheet plane of each vertical hole 5A is connected to the discharge rectifying portion 350.

In the structure of the present embodiment, an existing frame body 32 that includes an introduction rectifying portion 330 on a lower portion of the frame body 32, and a discharge rectifying portion 350 on an upper portion of the frame body 32 can be used.

Eighth Embodiment

Figure 15:
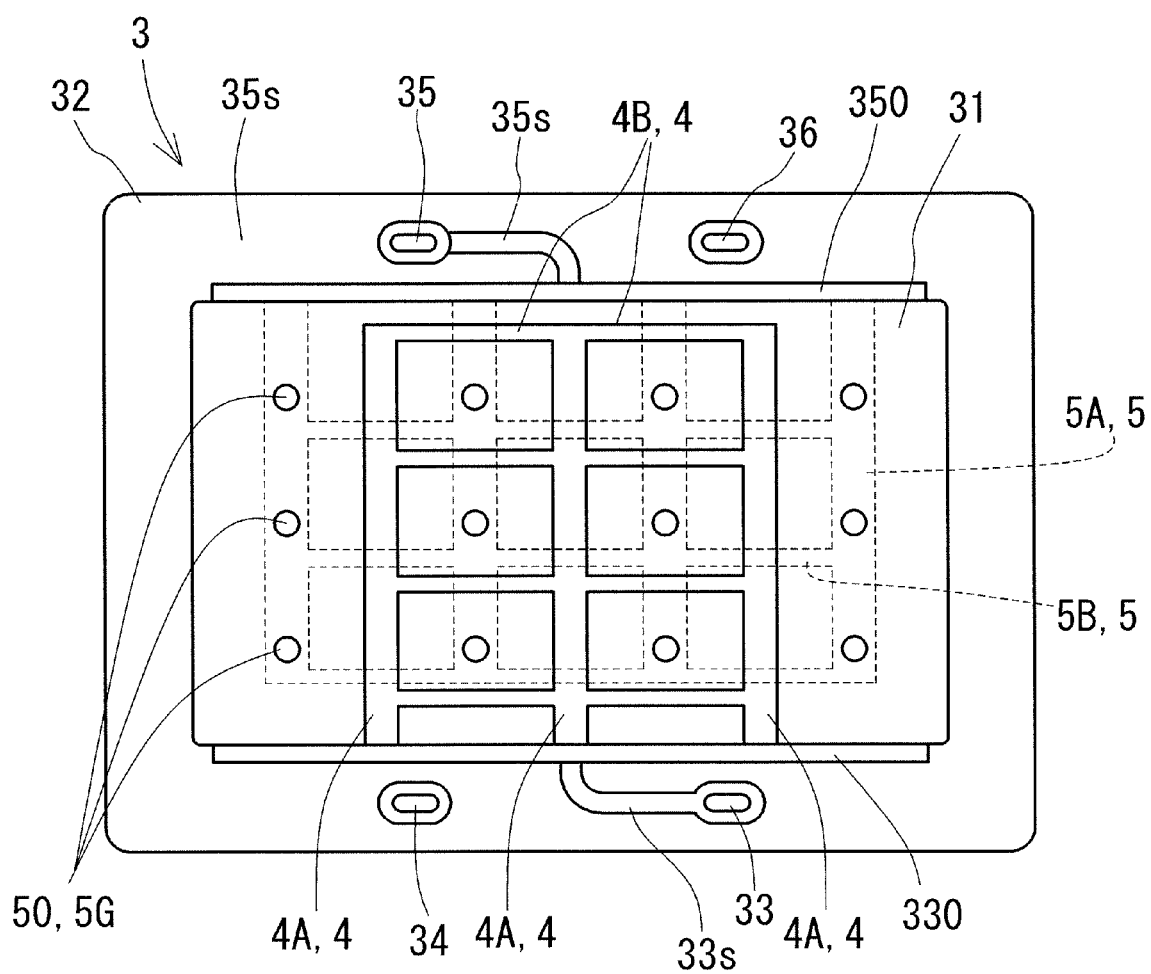
FIG. 15 is a plan view of a cell frame according to an eighth embodiment as seen from the side of a first surface.

In an eighth embodiment, an example in which an electrolyte is discharged from the side of an upper edge of a bipolar plate 31 is described based on FIG. 15.

The bipolar plate 31 of the present embodiment includes an introduction channel 4 in which vertical grooves 4A and lateral grooves 4B are disposed in the form of a lattice. Although the lateral grooves 4B need not be provided, an electrolyte easily spreads over a surface of the bipolar plate 31 by the lateral grooves 4B. The lateral groove 4B that is disposed on the side of an upper edge of the bipolar plate 31 connects upper ends of three vertical grooves 4A. The other lateral grooves 4B connect intermediate portions of the three vertical grooves 4A in an extension direction thereof. It is desirable that the groove width of each lateral groove 4B be smaller than the groove width of each vertical groove 4A.

In FIG. 15, a discharge rectifying portion 350 is formed at the side of the upper edge of the bipolar plate 31. Therefore, a discharge channel 5 (a pipe-like flow channel) includes vertical holes 5A. The vertical holes 5A are disposed in parallel with the vertical grooves 4A of the introduction channel 4 described above. Further, the discharge channel 5 of the present embodiment includes lateral holes 5B that connect the vertical holes 5A that are adjacent to each other. The lateral hole 5B that is disposed on the side of a lower edge of the bipolar plate 31 connects lower ends of four vertical holes 5A. The other lateral holes 5B connect intermediate portions of the four vertical holes 5A in an extension direction thereof. Therefore, the discharge channel 5 has a structure in which the vertical holes 5A and the lateral holes 5B are disposed in a lattice form. It is desirable that the sectional area of the lateral holes 5B be smaller than the sectional area of the vertical holes 5A. Although the lateral holes 5B need not be provided, the discharge efficiency of an electrolyte is increased by the lateral holes 5B.

According to the structure above, it is possible to fabricate a cell frame 3 by using a conventional frame body 32 in which an introduction rectifying portion 330 is formed on a lower portion of the frame body 32 and in which a discharge rectifying portion 350 is formed on an upper portion of the frame body 32. In addition, since the introduction channels 4 and the discharge channels 5 are formed in the form of a lattice, the ability of an electrolyte to flow at the bipolar plate 31 is improved.

Ninth Embodiment

Figure 16:
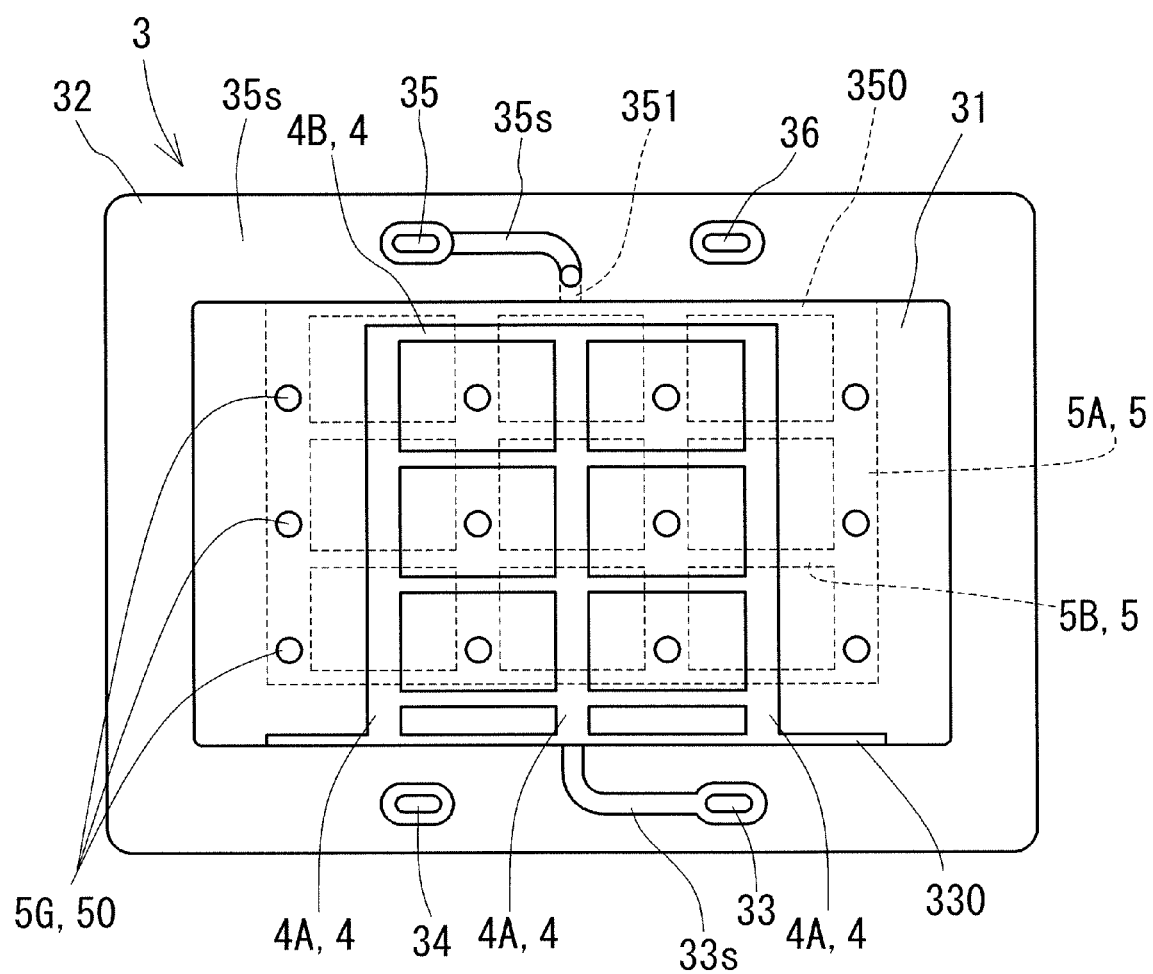
FIG. 16 is a plan view of a cell frame according to a ninth embodiment as seen from the side of a first surface.

In a ninth embodiment, a cell frame 3 in which an introduction rectifying portion 330 and a discharge rectifying portion 350 are both provided at a bipolar plate 31 is described based on FIG. 16.

In an introduction channel 4 of the present embodiment, the introduction rectifying portion 330 is formed on introduction-side end portions of vertical grooves 4A. A left end of the introduction rectifying portion 330 is disposed on a left side with respect to the left vertical groove 4A, and a right end of the introduction rectifying portion 330 is disposed on a right side with respect to the right vertical groove 4A. An electrolyte that has been introduced into the introduction rectifying portion 330 from a liquid supply slit 33s spreads quickly in a width direction (a lateral direction in a sheet plane) of the bipolar plate 31.

In a discharge channel 5 of the present embodiment, the hole-like discharge rectifying portion 350 is formed so as to connect upper ends of vertical holes 5A to each other. A liquid discharge hole 351 that is connected to the discharge rectifying portion 350 that is formed at the bipolar plate 31 is formed in a frame body 32. An upper end of the liquid discharge hole 351 is connected to a liquid discharge slit 35s that extends in a thickness direction of the frame body 32.

Even the structure of the present embodiment can provide advantageous effects that are the same as those of the fifth embodiment. In the bipolar plate 31 of the present embodiment, the introduction channel 4 may be a pipe-like flow channel and the discharge channel 5 may be a groove-like flow channel 5.

REFERENCE SIGNS LIST

1 RF battery (redox flow battery)
10 cell, 11 membrane, 14 positive electrode, 15 negative electrode
10P positive circulation mechanism
16 positive tank, 16A, 17A supply pipe, 18 pump
10N negative circulation mechanism
17 negative tank, 16B, 17B return pipe, 19 pump
2 cell stack
20 substack, 21 supply/discharge plate, 22 end plate, 23 fastening mechanism
3 cell frame
31A, 31B, 31C, 31D, 31E division plate
31 bipolar plate, 32 frame body, 32o recessed portion
33, 34 liquid supply manifold, 35, 36 liquid discharge manifold
33s, 34s liquid supply slit, 35s, 36s liquid discharge slit
37 sealing member
330, 340 introduction rectifying portion, 350, 360 discharge rectifying portion
351, 361 liquid discharge hole
4, 6 introduction channel (groove-like flow channel)
4A vertical groove, 4B lateral groove
40 inter-groove region
5, 7 discharge channel (pipe-like flow channel)
5A vertical hole, 5B lateral hole, 5G, 7G communication hole group, 5H long hole
50, 70 communication hole, 55 link groove, 57 long groove, 59, 79 outlet
100 power system
100C power converter

The invention claimed is:

1. A bipolar plate facing an electrode of a redox flow battery and comprising an introduction channel and a discharge channel of an electrolyte,
wherein one of the introduction channel and the discharge channel is a groove-like flow channel that is formed in a surface of the bipolar plate, and the other of the introduction channel and the discharge channel is a pipe-like flow channel that is formed in an inside of the bipolar plate, and
wherein the bipolar plate includes a communication hole that communicates with the pipe-like flow channel from the surface.

2. The bipolar plate according to claim 1,
wherein the introduction channel is the groove-like flow channel, and the discharge channel is the pipe-like flow channel.

3. The bipolar plate according to claim 1,
wherein the groove-like flow channel and the pipe-like flow channel extend in directions that intersect each other.

4. The bipolar plate according to claim 3,
wherein the groove-like flow channel and the pipe-like flow channel extend in directions that are orthogonal to each other.

5. The bipolar plate according to claim 1, comprising:
a plurality of the groove-like flow channels,
wherein at least one communication hole, the communication hole being the communication hole that communicates with the pipe-like flow channel from the surface, is disposed in an inter-groove region that is interposed between one of the groove-like flow channels and another one of the groove-like flow channels that is adjacent to the one of the groove-like flow channels.

6. The bipolar plate according to claim 5,
wherein the inter-groove region includes a communication hole group in which a plurality of the communication holes are disposed side by side in a direction along the groove-like flow channels.

7. The bipolar plate according to claim 6, comprising:
a link groove that connects to each other the communication holes that are close to each other in the communication hole group.

8. The bipolar plate according to claim 1,
wherein the introduction channel is the groove-like flow channel,
wherein the discharge channel is the pipe-like flow channel,
wherein at least one communication hole, the communication hole being the communication hole that communicates with the pipe-like flow channel from the surface, is disposed between a plurality of the groove-like flow channels, the plurality of the groove-like flow channels being one of the groove-like flow channels and another one of the groove-like flow channels that is adjacent to the one of the groove-like flow channels, and
wherein the introduction channel and the discharge channel extend in directions that are orthogonal to each other.

9. A cell frame comprising:
the bipolar plate according to claim 1; and
a frame body that is provided at an outer periphery of the bipolar plate.

10. A cell stack comprising:
the cell frame according to claim 9.

11. A redox flow battery comprising:
the cell stack according to claim 10.

* * * * *